United States Patent [19]

Tsujimura et al.

[11] Patent Number: 5,261,767
[45] Date of Patent: Nov. 16, 1993

[54] BORING BAR TOOL

[75] Inventors: Osamu Tsujimura; Masaaki Nakayama; Masayuki Okawa, all of Tokyo, Japan

[73] Assignee: Mitsubishi Metal Corporation, Tokyo, Japan

[21] Appl. No.: 917,189

[22] Filed: Jul. 22, 1992

Related U.S. Application Data

[62] Division of Ser. No. 544,176, Jun. 26, 1990, Pat. No. 5,156,503.

[30] Foreign Application Priority Data

| Jun. 26, 1989 | [JP] | Japan | 1-163301 |
| Jun. 26, 1989 | [JP] | Japan | 1-163302 |
| Jun. 26, 1989 | [JP] | Japan | 1-163303 |
| Jun. 26, 1989 | [JP] | Japan | 1-163304 |
| Apr. 24, 1990 | [JP] | Japan | 2-43720 |

[51] Int. Cl.⁵ .................................. B23B 29/02
[52] U.S. Cl. .................................. 408/187; 408/199; 408/713
[58] Field of Search ............... 408/186, 187, 188, 200, 408/231, 233, 713, 238; 407/47, 48, 102, 103

[56] References Cited

U.S. PATENT DOCUMENTS

| 1,577,952 | 3/1926 | Carnegie | 407/103 |
| 1,801,883 | 4/1931 | Smith . | |
| 3,195,376 | 7/1965 | Bader | 408/713 |
| 3,656,859 | 4/1972 | Rietzler et al. | 408/200 |
| 4,063,843 | 12/1977 | Barkley et al. . | |
| 4,097,181 | 6/1978 | Fisher | 408/187 |
| 4,125,342 | 11/1978 | Kress | 408/233 |
| 4,211,510 | 7/1980 | Hopkins | 408/186 |
| 4,721,422 | 1/1988 | Konwal | 408/713 |
| 4,850,757 | 7/1989 | Stashko | 408/186 |
| 4,998,851 | 3/1991 | Hunt | 408/233 |

FOREIGN PATENT DOCUMENTS

| 650246 | 9/1937 | Fed. Rep. of Germany . |
| 1074364 | 1/1960 | Fed. Rep. of Germany . |
| 1602764 | 9/1970 | Fed. Rep. of Germany . |
| 2614599 | 10/1977 | Fed. Rep. of Germany . |
| 57-166604 | 10/1982 | Japan . |
| 58-160004 | 9/1983 | Japan . |

*Primary Examiner*—Daniel W. Howell
*Attorney, Agent, or Firm*—Cushman, Darby & Cushman

[57] ABSTRACT

A boring bar tool for use with a tip is disclosed which has a tool body. The tip is mounted to one side of a forward end of the nose of the tool body. A neck is formed at a proximal end of the nose, and a shank in the form of a shaft is formed at a proximal end of the neck. The neck has a cross-sectional area in a plane perpendicular to an axis of the shank which is larger than the cross-sectional area of the shank in the plane.

1 Claim, 13 Drawing Sheets

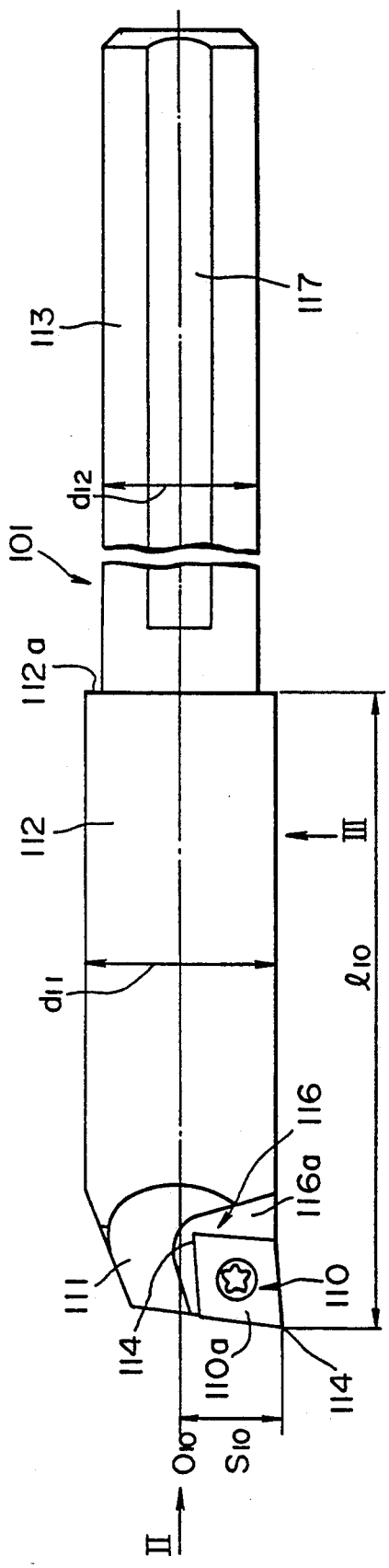
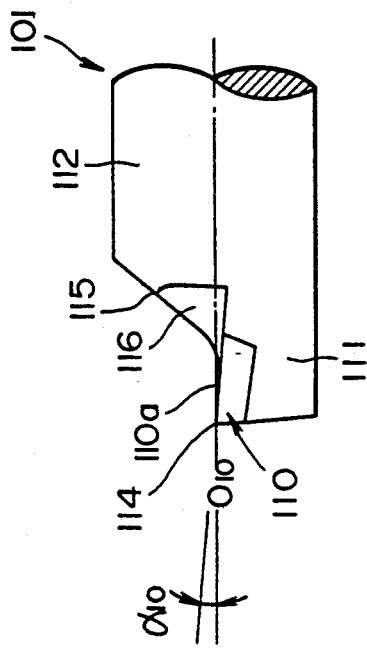
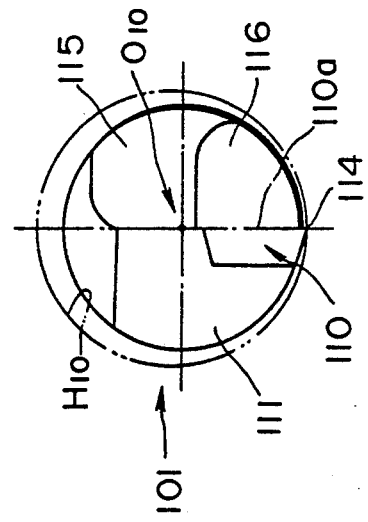

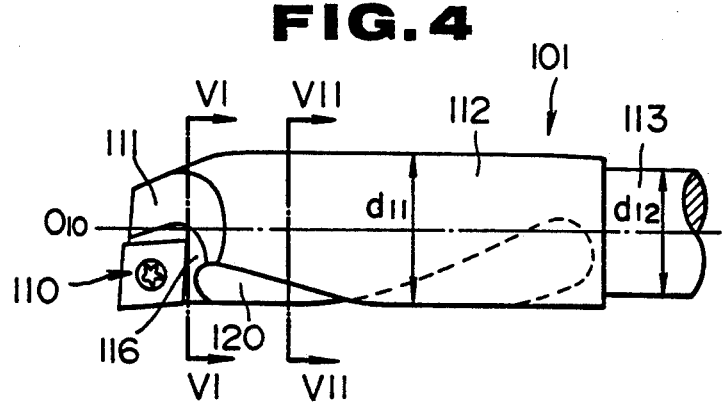
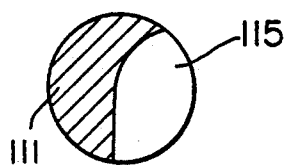
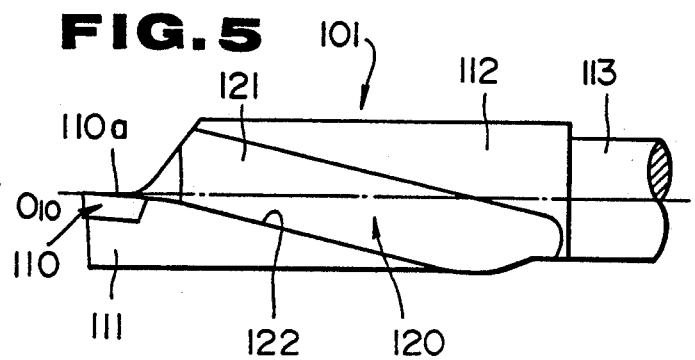
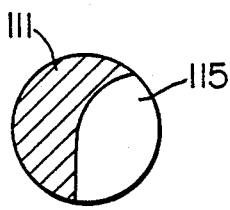
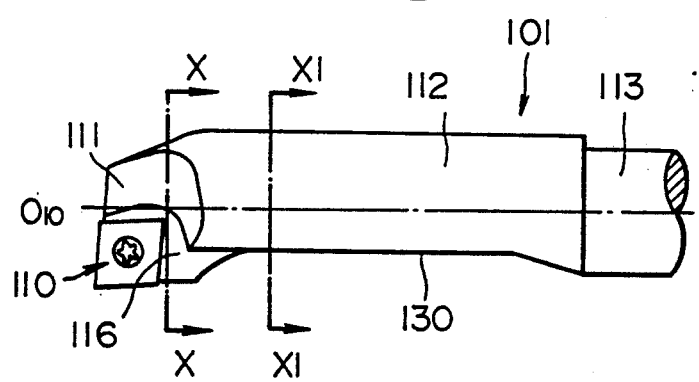
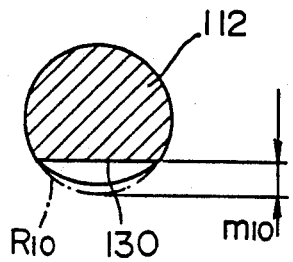
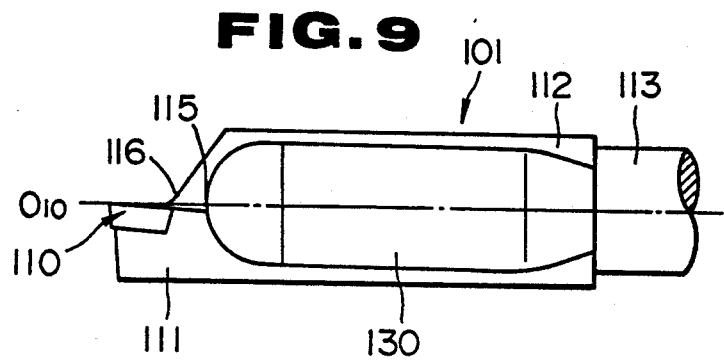

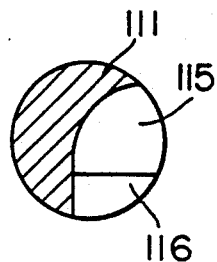
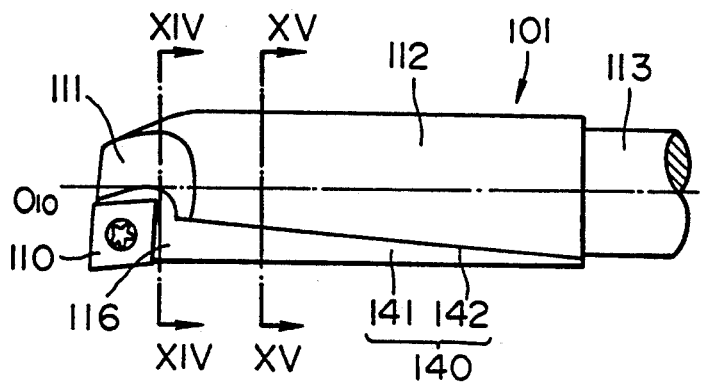
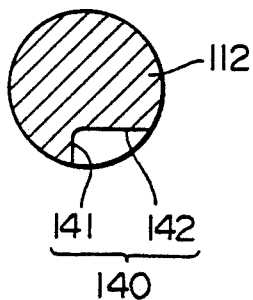
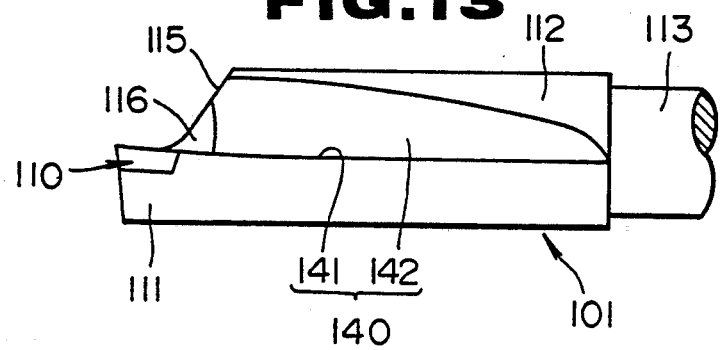
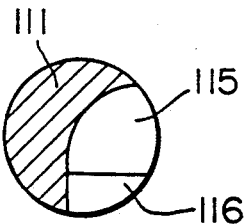
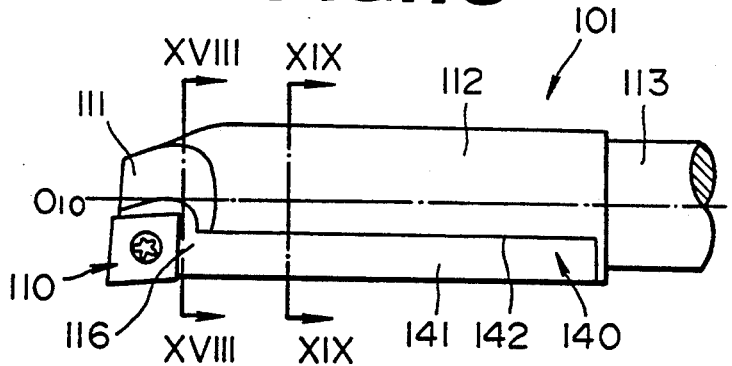
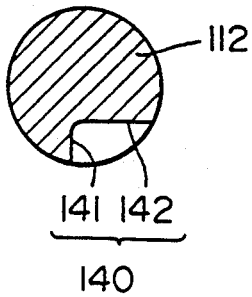
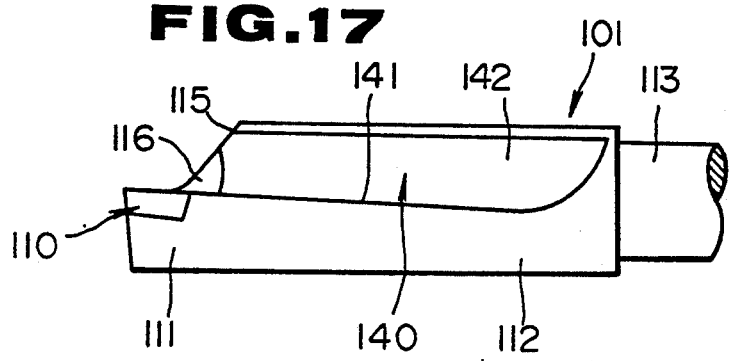

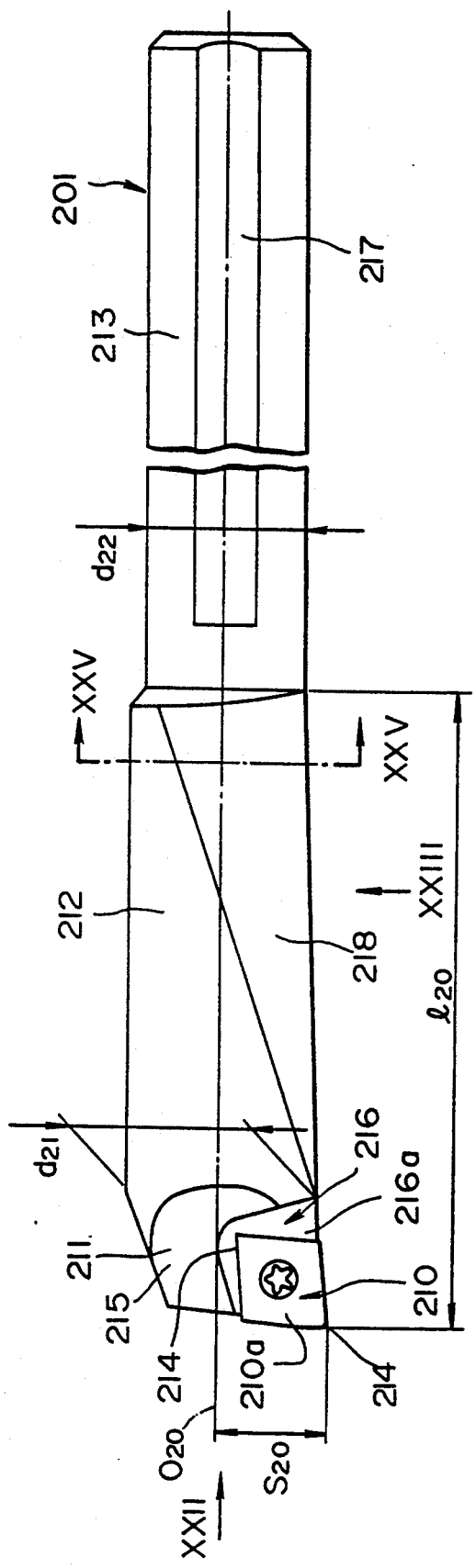
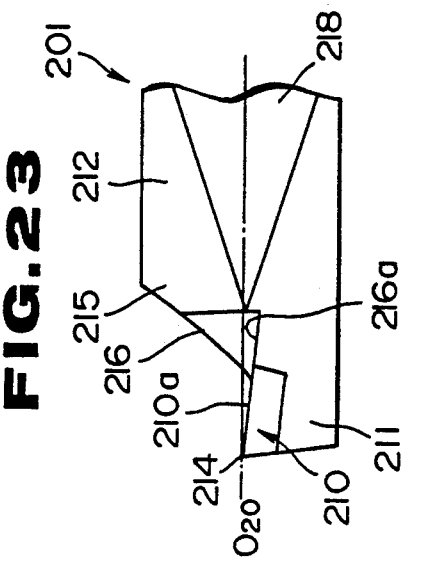
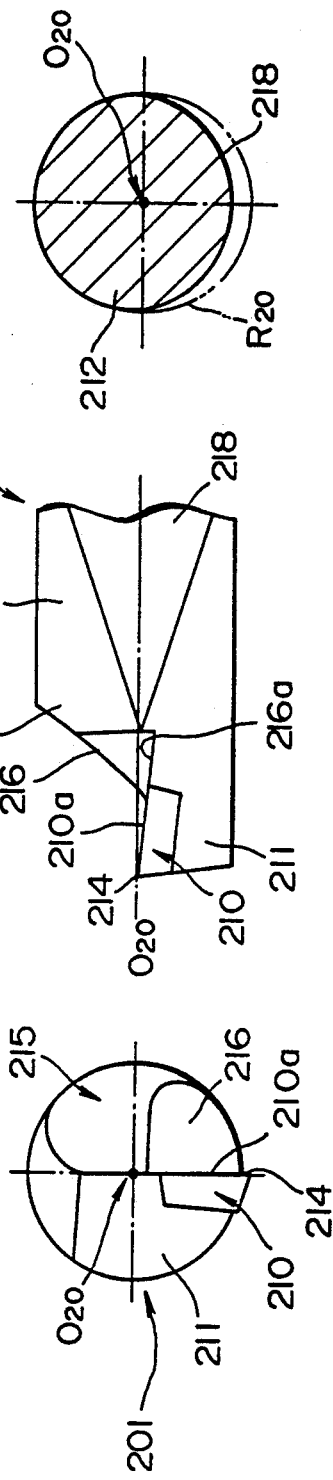

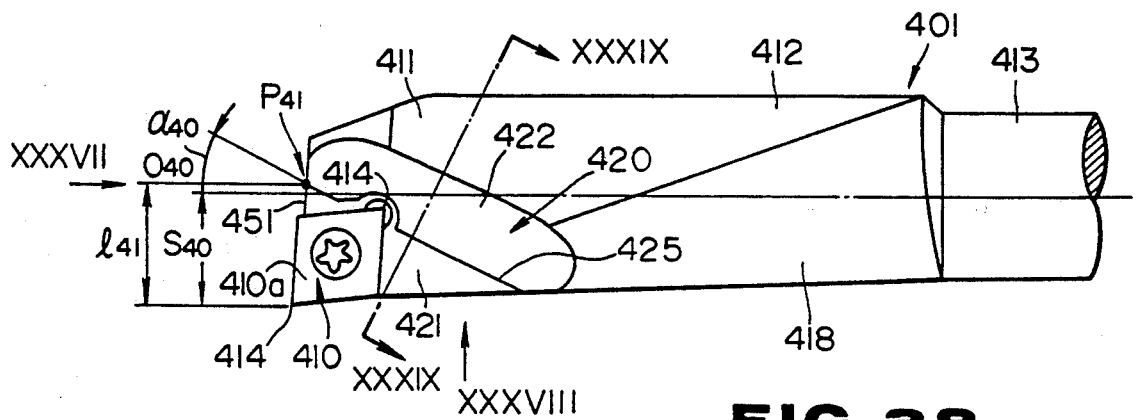
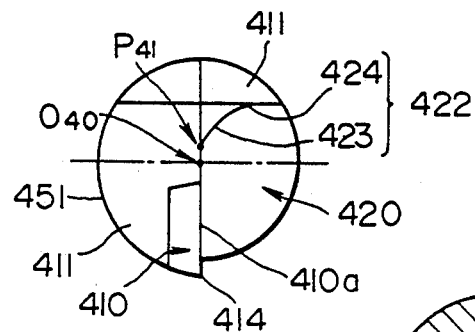
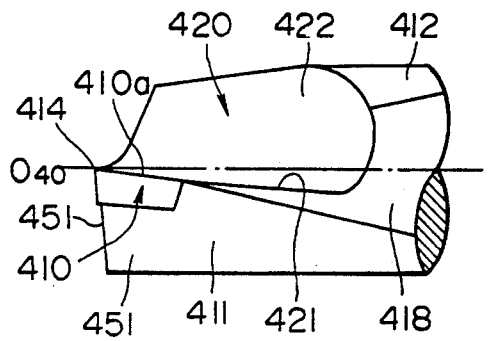
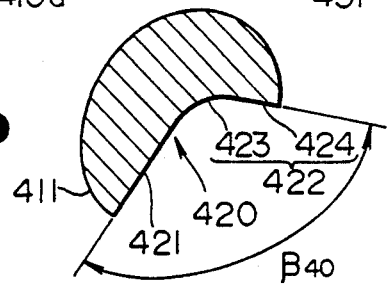
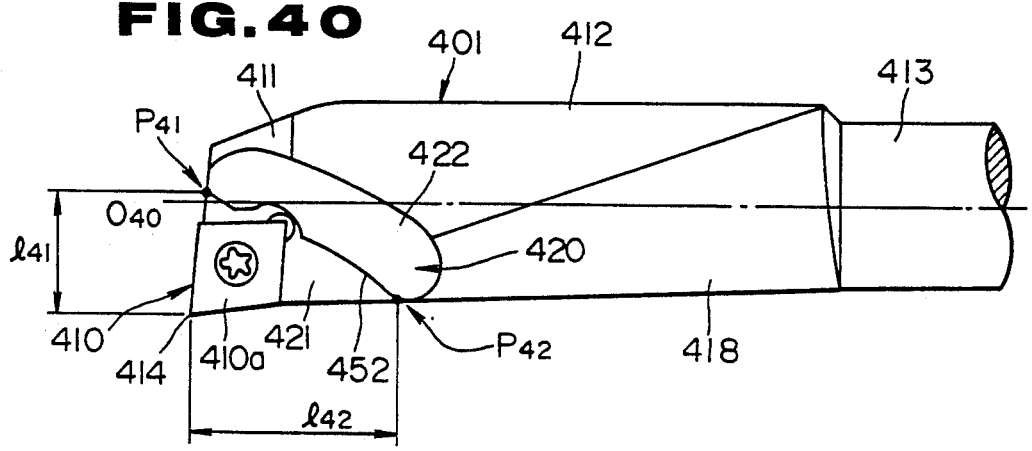

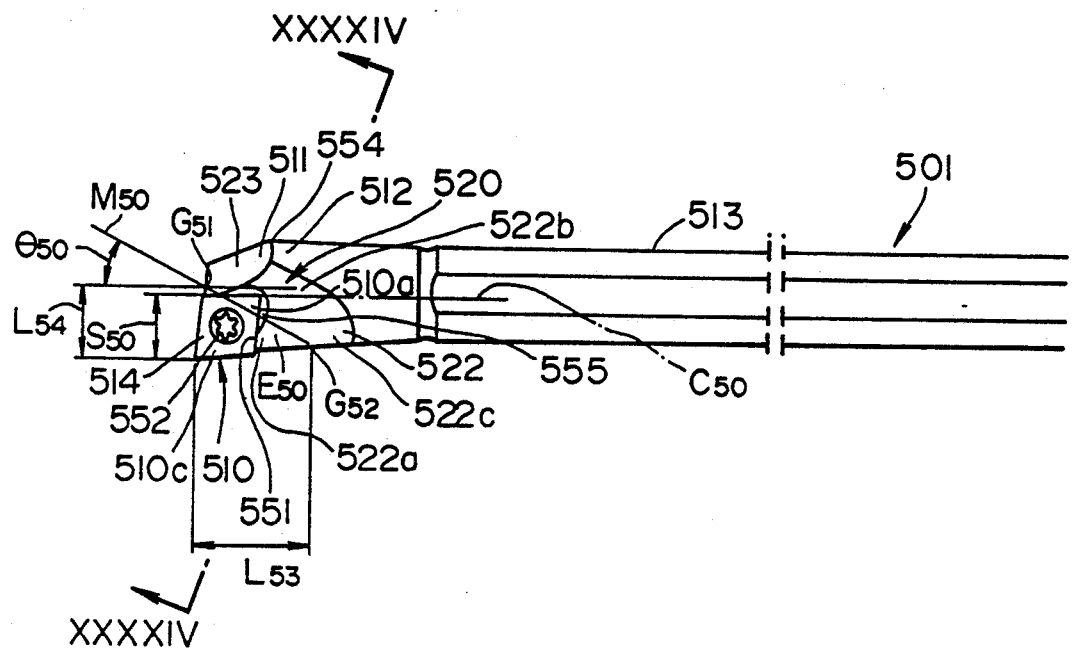
FIG. 41
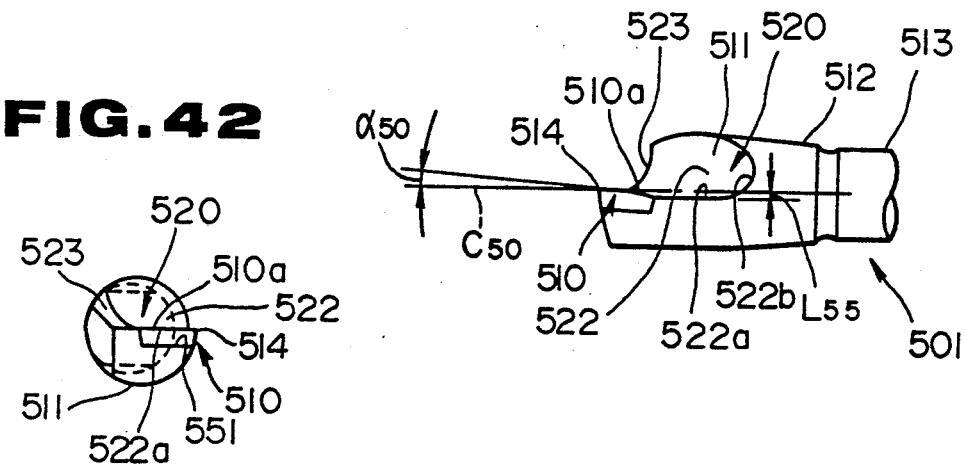
FIG. 42
FIG. 43

FIG. 46 (PRIOR ART)
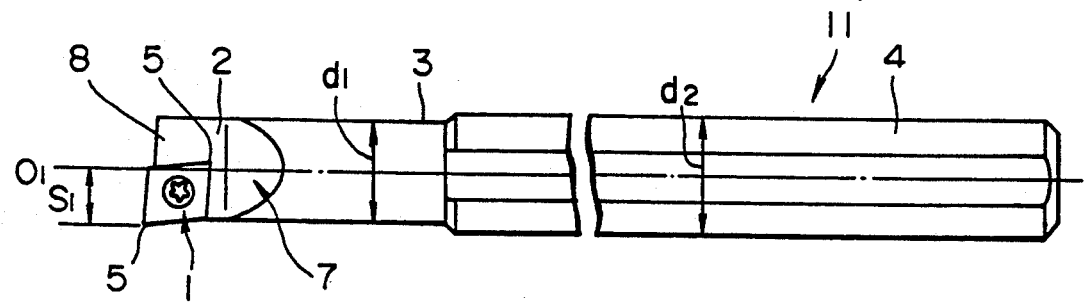
FIG. 47 (PRIOR ART)   FIG. 48 (PRIOR ART)
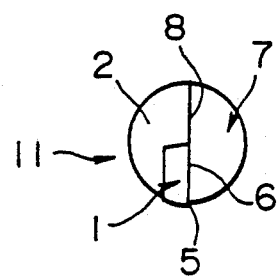 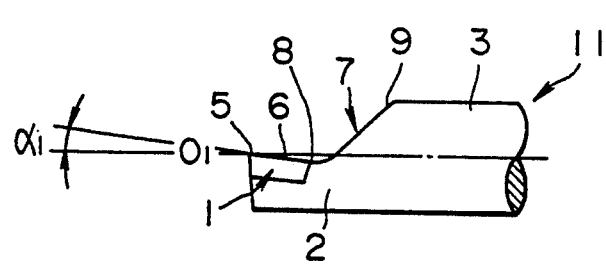
FIG. 49 (PRIOR ART)
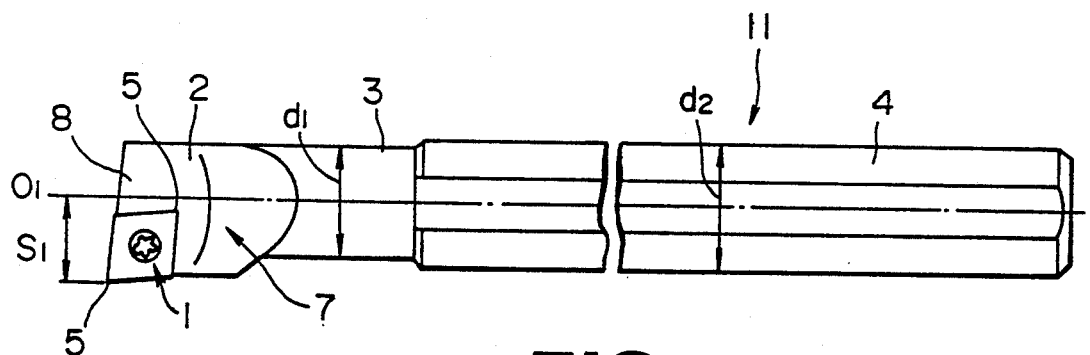
FIG. 50 (PRIOR ART)   FIG. 51 (PRIOR ART)
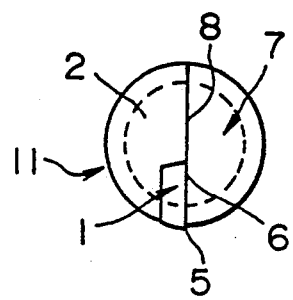 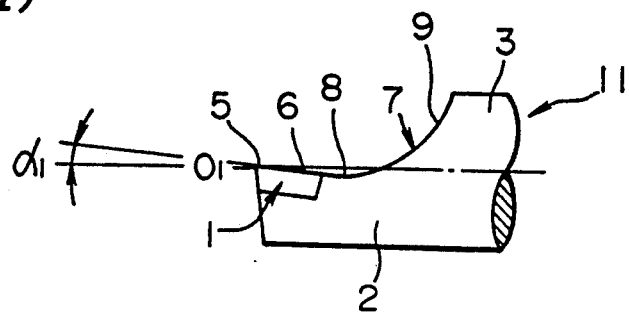

BORING BAR TOOL

This is a division of application Ser. No. 07/544,176, filed Jun. 26, 1990, now U.S. Pat. No. 5,156,503.

BACKGROUND OF THE INVENTION

The present invention relates to a boring bar tool used to process a bore in cutting processing work.

Boring bar tools of the kind referred to above are conventionally known; such tools are shown, for example, in FIGS. 46 through 48, FIGS. 49 through 51 and FIGS. 52 through 54 of the attached drawings. Each of the known boring bar tools has a tool body 11 which generally comprises a nose 2, a neck 3 in the form of a circular cylinder formed at a proximal end of the nose 2, and a shank 4, generally in the form of a circular cylinder formed at a proximal end of the neck 3. The forward end of the nose 2 has one side on which a throw-away tip (hereinafter referred simply to as "tip") 1 is mounted such that the tip 1 projects from an outer peripheral surface of the neck 2. Further, an upper rake angle $a_1$ is given to the tip 1 under these mounting conditions, as shown in FIGS. 48, 51 and 54.

The tip 1 is generally in the form of a rhombus in plan, and is mounted to the nose 2 such that either one of a pair of cutting edges 5 and 5 formed respectively at a pair of opposed corners of the tip 1 slightly projects from the forward end of the nose 2 and the outer peripheral surface thereof.

The neck 3 has a diameter $d_1$ which is smaller than the diameter $d_2$ of the shank 4. That is, the diameter $d_1$ of the neck 3 is set to a value equal to that of the nose 2 as shown in FIG. 46, or to a value smaller than that of the nose 2 as shown in FIGS. 49 and 52. More specifically, the diameter $d_1$ of the neck 3 is set to a value equal to or less than $1.4S_1$ with respect to a distance $S_1$ from an axis $O_1$ of the shank 4 to the outermost cutting edge 5 of the tip 1 in a front elevational view of the nose 2 from the axial direction of the shank 4.

The nose 2 is formed with a chip pocket 7 for discharging, without hindrance or stagnation, chips generated by the cutting edge 5 of the tip 1. The chip pocket 7 opens to the forward end of the tool body 11 and to the outer peripheral surface thereof. The chip pocket 7 has a face 8 which is substantially flush with the face 6 of the tip 1 and an inclined surface 9 which is gradually inclined toward the outer peripheral surface of the upper portion of the nose 2 as it approaches the proximal end of the nose 2 from the rearward end of the face 8.

The boring bar tool constructed in the above manner is used as follows, to process a bore in a work, that is, to enlarge the diameter of a bore which has been formed beforehand in the work. Specifically, the shank 4 is mounted to a tool gripping section of a machining tool, for example, to the tailstock of a lathe, by means of a holder (not shown). The work is mounted to a work gripping section of the machining tool, for example, to a chuck of the lathe, so that the bore in the work has its axis oriented in a parallel relationship to the axis $O_1$ of the shank 4. Relative movement in the axial direction of the shank 4 is given to the tool gripping section of the machining tool and the work gripping section thereof, while the work is rotated about the axis of the bore in the work, to insert the nose 2 and the neck 3 of the tool body 11 into the bore in the work. By doing so, the wall surface of the bore in the work is cut by the cutting edge 5 of the tip 1 to enlarge the bore to a predetermined dimension.

At this time, chips generated by the cutting edge 5 of the tip 1 are discharged to the face 8 of the tip pocket 7. The chips are guided toward the outer periphery of the neck 2 along the inclined surface 9 and, further, are discharged toward the proximal end of the tool body 11 through a gap between the outer peripheral surface of the neck 2 and the wall surface of the bore in the work.

In bore processing using the conventional boring bar tool described above, the bore in the work is cut under so-called cantilever conditions so that the nose 2 and the neck 3 of the tool body 11 project from the tool gripping section of the machining tool. Accordingly, the following problem arises. That is, during cutting, extreme shivering or shaking vibration tends to occur at the section of the tool body 11 extending between the nose 2 and the neck 3. Thus, the surface roughness of the cut surface deteriorates, the cutting edge 5 of the tip 1 is broken, and so on.

In order to solve the above problem, the following trial or attempt has been made. That is, the neck 3 and the shank 4 are united by cemented carbide and are brazed to the nose 2, or the diameter $d_2$ of the shank 4 is made larger than the diameter $d_1$ of the neck 3 as far as possible, thereby improving the tool rigidity and the attaching rigidity of the shank 4 and restricting the amplitude of the shivering or shaking vibration. However, such a trial or attempt has had the following problem. That is, if the rigidity exceeds a certain predetermined limit, the shivering or shaking vibration cannot be further reduced, even if the rigidity is improved, so that there is a fixed limit to the decrease in the shivering or shaking vibration. Further, there is also a disadvantage in that copious use of the cemented carbide considerably increases the cost of the raw material of the boring bar tool.

Furthermore, in the conventional boring bar tool described above, the forward end of the nose 2 is cut out over the entire radial length thereof to form the face 8 of the chip pocket 7. Accordingly, the nose 2 is considerably lower in rigidity than the neck 3 and the shank 4. Thus the following disadvantage arises. That is, the nose 2 is easily deformed by the cutting resistance so that the height of the cutting edge 5 varies. As a result of the variation in the height of the cutting edge 5, the diameter or the like of the bore to be processed varies, so that the processing accuracy deteriorates.

Moreover, as shown in FIGS. 52 through 54, the tip pocket 7 is formed axially over a predetermined distance $S_2$ from the forward end of the tool body 11 and radially over the entire length of the nose 2. Accordingly, there is a problem in that the forward end of the neck 2, which holds the tip 1, is low in rigidity. Further, the face 8 of the tip pocket 7 is formed so as to be flush with the face 6 of the tip 1. If the upper rake angle $\alpha_1$ of the tip 1 increases like the side rake angle thereof, the aforesaid problem of reduction of the rigidity becomes remarkable.

If the forward end of the nose 2 is reduced in rigidity, a shivering or shaking vibration is induced during cutting, so that a bad influence is exerted upon the processing accuracy and smoothness of the finished surface of the work.

SUMMARY OF THE INVENTION

It is therefore an object of the invention to provide a boring bar tool which has a novel construction different from that of the conventional one and which is superior in vibration insulating performance.

It is another object of the invention to provide a boring bar tool in which the forward end of the tool body is high in rigidity, so that a superior processing accuracy can be realized.

According to the invention, there is provided a boring bar tool for use with a tip, the boring bar tool having a tool body which comprises:

a nose, the tip being mounted to one side of the forward end of the nose;

a neck formed at a proximal end of the nose; and a shank in the form of a shaft formed at a proximal end of the neck, wherein the neck has its cross-sectional area in a plane perpendicular to an axis of the shank, which is larger than a cross-sectional area of the shank in the plane.

With this arrangement of the invention, since the cross-sectional area of the neck is determined to be larger than that of the shank, in other words, since the cross-sectional area of the shank is smaller than that of the neck, the rigidity of the shank, which serves as a support when the boring bar tool is mounted to a machining tool in a cantilever fashion, is reduced, so that it is less than that of the forward end of the neck. Thus, the entire construction of the boring bar tool becomes a flexible or elastic construction in which vibrations differing from each other in accordance with mass and rigidity, in other words, the spring constant, of various sections of the entire boring bar tool, tend to occur.

In the above construction, since the cross-sectional area of the neck is larger than that of the shank so that the mass of the neck per unit length is larger than that of the shank, vibration is rendered discontinuous at the joining section between the neck and the shank. For this reason, the vibration occurring at the nose in accordance with the fluctuation in cutting resistance is not uniformly transmitted to the shank. As a result, vibrations differing in phase and frequency from each other occur at the boundary at the joining section between the neck and the shank. The interference of these vibrations with each other prevents the shivering or shaking vibration from being generated.

Preferably, the neck is formed with shaft-like configuration in which the cross-sectional area of the neck in the plane perpendicular to the axis of the shank is gradually reduced, while not being reduced to a value below that of the cross-sectional area of the shank in the plane, as it approaches the proximal end of the neck from the forward end thereof. A flank is formed on an outer periphery of the neck contiguous to the tip. The flank approaches the axis of the shank as it approaches the proximal end of the neck from the forward end thereof.

With the above arrangement of the invention, since the cross-sectional area of the neck in the plane perpendicular to the axis of the shank is reduced as it approaches the proximal end of the neck from the forward end thereof, the rigidity of the shank is reduced to a value below that of the forward end of the neck, so that the entire construction of the boring bar tool becomes an elastic or flexible construction in which vibrations differing from each other in accordance with mass or rigidity, in other words, the spring constant, of various sections of the boring bar tool, tend to occur.

Further, with the above arrangement, the mass of each of the various sections of the neck is reduced in the direction of the shank in accordance with a change or variation in the cross-sectional area of the neck, and vibration occurring at the nose in accordance with the fluctuation in the cutting resistance is not uniformly transmitted, so that vibrations different in frequency from each other in accordance with the mass of each section occur in the portion extending from the nose toward the proximal end of the neck. Moreover, since the flank is provided on the outer periphery of the neck adjacent to the tip and gradually approaches the axis of the shank as it approaches the proximal end of the neck from the forward end thereof, the axis position of the neck is gradually spaced away from the axis of the shank as the proximal end is approached from the forward end. For this reason, the transmitting direction of the vibration changes or varies gradually without being made uniform in the axial direction of the shank. Thus, even if vibration occurs at the nose in accordance with the fluctuation in the cutting resistance, vibrations differing in frequency and phase from each other occur at each section of the neck, and interfere with each other. As a result, the generation of the shivering or shaking vibration is prevented.

Furthermore, by the provision of the flank, as the neck is deeply inserted in the bore in the work, that is, as processing proceeds, the gap between the side of the outer peripheral surface of the neck, which is contiguous to the tip, and the wall surface of the bore in the work is gradually enlarged. For this reason, the chips discharged from the tip toward the outer periphery of the neck are easily discharged from the bore through the gap. As a result, the chip discharge ability in the case where the processing depth is particularly large or deep is improved, so that accidents such as the damage of the processed surface, breakage of the tip and so on due to clogging of the chips are avoided. Thus, an excellent advantage is exhibited in that, in combination with the above-mentioned effects of avoiding the shivering or shaking vibration, an excellent finished surface is always obtained.

Preferably, the neck is formed with shaft-like configuration in which the cross-sectional configuration of the neck in the plane perpendicular to the axis of the shank forms an arc which is coaxial with a cross-sectional arc in the plane. The cross-sectional area of the neck in the plane is gradually reduced, while not being reduced to a value below that of the cross-sectional area of the shank in the plane as the proximal end of the neck is approached from the forward end thereof.

With the above arrangement of the invention, since the cross-sectional area of the neck, that is, the diameter thereof, is gradually reduced as the proximal end of the neck is approached from the forward end thereof, the radial gap between the wall surface of the bore in the work and the outer peripheral surface of the neck during cutting is gradually enlarged over the entire peripheral length as the processing proceeds, that is, as the neck is deeply inserted into the bore. For this reason, the chips discharged from the tip toward the outer periphery of the neck are easily discharged from the bore through the gap. As a result, the chip discharge ability in the case where the processing depth is particularly large or deep is improved, so that accidents such as the damage of a processed surface, breakage of the tip and so on due to clogging of the chips are avoided.

Preferably, the boring bar tool further comprises a chip pocket formed in the forward end of the tool body, generally in the form of a circular cylinder. The chip pocket opens to a flank at the forward end of the tool body and an outer peripheral surface thereof. The tip projects toward the forward end and the outer peripheral surface of the tool body. The chip pocket is formed with a groove configuration in a top plan view of the tip. The groove configuration extends from a position adjacent to the cutting edge from the end of the flank located on the radially opposite side with respect to the tip, to the side of the outer peripheral surface of the tool body contiguous to the tip.

With the above arrangement of the invention, since the chip pocket extends to the side of the outer peripheral surface of the tool body, which is contiguous to the tip, from a midway section of the flank at the forward end of the chip pocket, the forward end of the tool body is not cut out over the entire radial length as is in the conventional chip pocket, but rather a portion behind the chip pocket, that is, a portion at the forward end of the tool body, which is located on the radially opposite side of the forward end of the tool body with respect to the tip, is left in the form of a rib. For this reason, the rigidity of the forward end of the tool body is improved, so that the amount of deformation of the forward end of the tool body due to cutting resistance is reduced. Thus, an excellent advantage is obtained in that the height of the tip is prevented from varying in accordance with the deformation of the forward end of the tool body, so that excellent processing accuracy can be realized.

Preferably, the boring bar tool further comprises a chip pocket formed in the forward end of the tool body. The chip pocket is contiguous to a face of the tip. The chip pocket is composed of a first chip-pocket section and a second chip-pocket section. The first chip-pocket section is inclined at an angle within a range of from 15° to 45° with respect to the axis of the tool body in a top plan view of the tip. The first chip- pocket section opens to an outer peripheral surface of the tool body. The second chip-pocket section extends along a front cutting edge of the tip and opens to the outer peripheral surface of the tool body on the side opposite to the side where the first chip-pocket section opens.

With the above arrangement of the invention, the chips generated by the tip are guided to the outside by either one of the first and second chip-pocket sections from the face of the tip.

By the fact that a non-cut-out section is left between the first and second chip-pocket sections at the forward end of the tool body, the tool body extends to a location adjacent to the tip. In other words, a thick wall section extending to the vicinity of the tip is formed at the forward end of the tool body. Thus, the wall thickness of the forward end can be secured. That is, the reduction in the rigidity of the forward end of the tool body is restricted, so that shivering or shaking at cutting is restrained, and cutting which is high in accuracy and excellent in finishing is made possible.

Preferably, an intersected ridgeline between the bottom surface of the first chip-pocket section and the outer peripheral surface of the tool body extends substantially parallel to the axis of the tool body.

With the above arrangement of the invention, even if the rake angle of the tool body is made large, reduction in the wall thickness of the portion below the first chip-pocket section is restricted. Thus, it is possible to secure the rigidity of the forward end.

BRIEF DESCRIPTION OF THE DRAWINGS

FIG. 1 is a top plan view of a boring bar tool according to a first embodiment of the invention;

FIG. 2 is a view as viewed from the arrow II in FIG. 1;

FIG. 3 is a fragmentary view as viewed from the arrow III in FIG. 1;

FIG. 4 is a fragmentary top plan view of a boring bar tool according to a first modification of the first embodiment illustrated in FIGS. 1 through 3;

FIG. 5 is a fragmentary side elevational view of the boring bar tool illustrated in FIG. 4;

FIG. 6 is a cross-sectional view taken along the line VI—VI in FIG. 4;

FIG. 7 is a cross-sectional view taken along the line VII—VII in FIG. 4;

FIG. 8 is a fragmentary top plan view of a boring bar tool according to a second modification of the first embodiment illustrated in FIGS. 1 through 3;

FIG. 9 is a fragmentary side elevational view of the boring bar tool illustrated in FIG. 8;

FIG. 10 is a cross-sectional view taken along the line X—X in FIG. 8;

FIG. 11 is a cross-sectional view taken along the line XI—XI in FIG. 8;

FIG. 12 is a fragmentary top plan view of a boring bar tool according to a third modification of the first embodiment illustrated in FIGS. 1 through 3;

FIG. 13 is a fragmentary side elevational view of the boring bar tool illustrated in FIG. 12;

FIG. 14 is a cross-sectional view taken along the line XIV—XIV in FIG. 12;

FIG. 15 is a cross-sectional view taken along the line XV—XV in FIG. 12;

FIG. 16 is a fragmentary top plan view of a boring bar tool according to a fourth modification of the first embodiment illustrated in FIGS. 1 through 3;

FIG. 17 is a fragmentary side elevational view of the boring bar tool illustrated in FIG. 16;

FIG. 18 is a cross-sectional view taken along the line XVIII—XVIII in FIG. 16;

FIG. 19 is a cross-sectional view taken along the line XIX—XIX in FIG. 16;

FIG. 21 is a top plan view of a boring bar tool according to a second embodiment of the invention;

FIG. 22 is a view as viewed from the arrow XXII in FIG. 21;

FIG. 23 is a fragmentary view as viewed from the arrow XXIII in FIG. 21;

FIG. 25 is a cross-sectional view taken along the line XXV—XXV in FIG. 21;

FIG. 36 is a fragmentary top plan view of a boring bar tool according to a fourth embodiment of the invention;

FIG. 37 is a view as viewed from the arrow XXXVII in FIG. 36;

FIG. 38 is a fragmentary view as viewed from the arrow XXXVIII in FIG. 36;

FIG. 39 is a cross-sectional view taken along the line XXXIX—XXXIX in FIG. 36;

FIG. 40 is a view similar to FIG. 36, but showing a modification of the fourth embodiment illustrated in FIG. 36;

FIG. 41 is a fragmentary top plan view of a boring bar tool according to a fifth embodiment of the invention;

FIG. 42 is a front elevational view of the boring bar tool illustrated in FIG. 41;

FIG. 43 is a fragmentary side elevational view of a principal portion in FIG. 41;

FIG. 46 is a top plan view of a conventional boring bar tool;

FIG. 47 is a front elevational view of the boring bar tool illustrated in FIG. 46;

FIG. 48 is a fragmentary side elevational view of the boring bar tool illustrated in FIG. 46;

FIG. 49 is a top plan view of another conventional boring bar tool;

FIG. 50 is a front elevational view of the boring bar tool illustrated in FIG. 49;

FIG. 51 is a fragmentary side elevational view of the boring bar tool illustrated in FIG. 49;

DESCRIPTION OF THE EMBODIMENTS

Figure 24A:
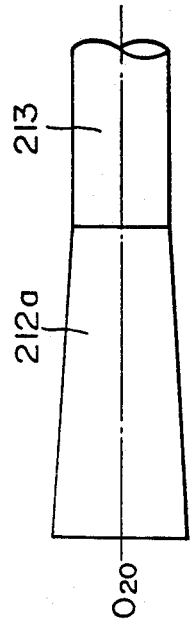
FIGS. 24(a) and 24(b) are fragmentary views for explanation of a procedure for forming a flank.

Various embodiments of the invention will be described below with reference to the drawings. It should be noted that like or similar components and parts are designated by the same or like reference numerals throughout the drawings, and the description of the like or similar components and parts will be simplified or omitted to avoid repetition.

First Embodiment

Referring first to FIGS. 1 through 3, there is shown a boring bar tool according to a first embodiment of the invention. As shown in FIG. 1, the boring bar tool has a tool body 101 which comprises a nose 111, a neck 112 in the form of a circular cylinder formed at a proximal end of the nose 111, and a shank 113 generally in the form of a circular cylinder formed at a proximal end of the neck 112. The forward end of the nose 111 has one side on which a throw-away tip (hereinafter referred simply to as "tip") 110 is mounted.

As shown in FIGS. 1 through 3, the tip 110 is such that cemented carbide is formed into a plate-like configuration generally in the form of a rhombus in plan. The tip 110 has a pair of cutting edges 114 and 114 respectively at a pair of opposed corners of the tip 110. The tip 110 is detachably mounted to the nose 111 such that either one of the cutting edges 114 projects from the forward end and the outer peripheral surface of the nose 111, and a positive rake angle $a_{10}$ is given to the face 110a of the tip 110. The tip 110 has a height which is so set to be substantially flush with the axis $O_{10}$ of the shank 113, as shown in FIG. 3, which is a fragmentary side elevational view of the tool body 101.

The nose 111 is formed therein with a chip pocket 115 at a part of the circular cylinder of the tool body 101 which opens upwardly toward the forward end of the tool body 101. The chip pocket 115 is provided for discharging, without hindrance or stagnation, chips generated along the face 110a of the tip 110. The chip pocket 115 has a wall surface which is formed into an inclined surface gradually inclined upwardly toward the proximal end of the nose 111 from the forward end of the chip pocket 115, which is set to a height substantially identical to the axis $O_{10}$ of the shank 113. A clearance recess 116 is formed at a position on the chip pocket 115; it faces toward the rearward end of the tip 110. The clearance recess 116 opens toward a portion of the outer peripheral surface of the neck 112 at the forward end thereof, which faces toward or is contiguous to the tip 110. The clearance recess 116 has a bottom surface 116a which is so set as to be substantially flush with the face 110a of the tip 110.

The neck 112 has an outer peripheral are in a plane extending perpendicular to the axis $O_{10}$ of the shank 113, which is the same in diameter as the nose 111 and which is coaxial with the latter. The neck 112 has a diameter $d_{11}$ which is so set as to be larger than the diameter $d_{12}$ of the shank 113 subsequently to be described.

The diameter $d_{11}$ of the outer peripheral arc of the neck 112 in the above plane may be suitably determined in accordance with cutting conditions and so on. If possible, however, it is preferable that the diameter $d_{11}$ be set to a value within a range of $1.6S_{10}$ to $1.9S_{10}$ with respect to a distance $S_{10}$ from the axis $O_{10}$ of the shank 113 to the forward end of the cutting edge 114 in the plane extending perpendicular to the axis $O_{10}$. If the diameter $d_{11}$ of the neck 112 is less than $1.6S_{10}$, the avoidance of a shivering or shaking vibration due to a change in mass subsequently to be described may not be sufficiently exhibited. On the other hand, if the diameter $d_{11}$ exceeds $1.9S_{10}$, the gap formed between the outer peripheral surface of the neck 112 and the wall surface of a bore formed in a work when the neck 112 is inserted into the bore in the work may become insufficient, so that the discharge ability of the chips discharged from the chip pocket 115 by means of the peripheral surface of the neck 112 deteriorates.

Further, the neck 112 has a length which may be suitably determined in accordance with the axial length of the bore in the work. It is preferable, however, that the distance $l_{10}$ from the forward end of the cutting edge 114 to the proximal end of the neck 112 in the axial direction of the shank 113 be so set as to be a value within a range of $6S_{10}$ to $10S_{10}$ with respect to the above-described distance $S_{10}$. If the distance $l_{10}$ is less than $6S_{10}$, the vibration isolating effects due to the formation of the entire tool body 101 into a flexible or elastic construction may not be sufficiently exhibited. On the other hand, if the distance $l_{10}$ exceeds $10S_{10}$, the amount of static deflection due to the cutting resistance of the neck 112 may become excessively large, so that the processing accuracy deteriorates.

The shank 113 is formed thereon with a cut-out 117. That is, the cut-out 117 is formed on the outer peripheral surface of the shank 113, which is in the form of a circular cylinder whose diameter $d_{12}$ is smaller than the diameter $d_{11}$ of the neck 112. The cut-out 117 extends substantially over the entire axial length of the shank 113. The shank 113 is arranged so that it is fitted into the holder (not shown) and is mounted to the tool gripping section of the machining tool.

The boring bar tool constructed in the above mariner is used to process the diameter of the bore in the work in the following manner. That is, similarly to the conventional boring bar tool described previously, the shank 113 is mounted to the tool gripping section of the machining tool by means of the holder. Subsequently, relative movement in the axial direction of the shank 113 is given to the tool gripping section and the work gripping section of the machining tool, while the work gripped by the work gripping section of the machining tool is rotated about the axis of the bore $H_{10}$ formed in the work, as shown in FIG. 2, to insert the nose 111 and the neck 112 into the bore $H_{10}$ in the work. By doing so, the bore $H_{10}$ in the work is cut by the cutting edge 114 of the tip 110 to a predetermined dimension.

At this time, vibration occurs in the nose 111 due to the fluctuation in the cutting resistance acting between the cutting edge 114 of the tip 110 and the work. In this case, if the tool body 101 is high in rigidity as a whole, as in the conventional tool body, the entire tool body 101 vibrates as a single rigid body. Accordingly, the vibration due to the fluctuation in the cutting resistance is uniformly transmitted to the shank 113 from the nose 111 through the neck 112. Thus, shivering or shaking vibration occurs at the portion of the tool body 101 projecting from the tool gripping section of the machining tool, that is, from the portion (hereinafter referred simply to as "projecting portion") of the tool body 101 extending from the nose 111 to the neck 112.

In the boring bar tool according to the first embodiment of the invention, however, the cross-sectional area of the neck 112 in the plane perpendicular to the axis $O_{10}$ of the shank 113 is determined to be larger than that of the shank 113. Accordingly, the shank 113 is reduced in rigidity, so that it has less rigidity than the neck 112. Thus, the boring bar tool according to the first embodiment acquires, as a whole, to a flexible or elastic construction in which vibration which varies in frequency and phase in accordance with a mass or rigidity, in other words, a spring constant, tends to occur in each section of the tool body 101.

In the boring bar tool according to the first embodiment of the invention, since the mass of the neck 112 per unit length is larger than that of the shank 113, vibration is rendered discontinuous at the boundary of the joining section between the neck 112 and the shank 113. For this reason, the vibration occurring at the nose 111 due to the fluctuation in the cutting resistance is not uniformly transmitted to the shank 113. As a result, vibrations which are different in frequency and phase from each other occur at the boundary of the joining section between the neck 112 and the shank 113. The interference of these vibrations with each other prevents the shivering or shaking vibration from being generated.

Further, in the boring bar tool according to the first embodiment of the invention, since the diameter $d_{11}$ of the neck 112 is larger than the diameter $d_{12}$ of the shank 113, an end face 112a of the neck 112 is abutted against an end face of the holder to receive a feeding component force applied toward the shank 113 in the axial direction of the tool body 101 during cutting, whereby it is possible to secure restriction of movement of the cutting edge 114 of the tip 110 in the axial direction of the shank 113.

In the first embodiment of the invention, the tip 110 is specifically mounted to the tool body 101 in a detachable manner. The invention should not be limited to this specific form. It is of course true that the invention is applicable to an arrangement such as that in which a tip is brazed to the tool body, or in which various parts of the tool body from the cutting edge to the shank are formed in an integral manner.

Moreover, in the first embodiment, the neck 112 has a cross-sectional configuration which is particularly circular. However, the invention should not be limited to this specific form. The invention can be suitably modified into a form such as that in which the neck 112 has a polygonal cross-sectional configuration.

Further, particularly remarkable differences in the configuration of the chip pocket 115 do not exist between the boring bar tool according to the first embodiment of the invention and a conventional boring bar tool. Since, however, the diameter $d_{11}$ of the neck 112 in the first embodiment is larger than the diameter $d_{12}$ of the shank 113, there may be a case where the chip discharge ability from the outer peripheral surface of the neck 112 deteriorates slightly. As a countermeasure, a groove or the like for discharging the chips may be formed in the neck 112. In this connection, various modifications of the neck 112 will be described with reference to FIGS. 4 through 19.

First Modification of First Embodiment

A first modification of the first embodiment is constructed as follows, as shown in FIGS. 4 through 7. That is, a twisted groove 120 is formed in the outer peripheral surface of the neck 112. The twisted groove 120 opens to the clearance recess 116 of the chip pocket 115, and is gradually twisted in a clockwise direction as viewed from the forward end of the tool body 101, as it approaches the proximal end of the neck 112 from the forward end thereof.

As shown in FIG. 7, which is a cross-sectional view of the neck 112 taken in a plans perpendicular to the axis $O_{10}$ of the shank 113, the twisted groove 120 comprises a first wall 121 and a second wall 122. The first wall 121 extends substantially straight from a location adjacent to the center of the neck 112 toward the outer peripheral surface thereof. The second wall 122 starts from an initial point at the inward end of the first wall 121, and extends toward the outer peripheral surface of the neck 112, while being curved toward the side spaced away from the first wall 121. The first wall 121 is formed flush with the face 110a of the tip 110 and contiguous to the bottom surface of the clearance recess 116.

The twisted groove 120 has a cross-sectional dimension which may be suitably determined in accordance with the material or the like of the work. It should be noted, however, that the formation of the twisted groove 120 does not reduce the cross-sectional area of the neck 112 to 4 point at which it is less than the cross-sectional area of the shank 113. Further, the twisted angle and the twisting direction of the twisted groove 120 may be suitably determined in accordance with the rake angle $\alpha_{10}$ of the tip 110.

In the first modification described above, the chips generated by the tip 110 and discharged into the clearance recess 116 of the chip pocket 115 are discharged toward the proximal end of the neck 112 through the twisted groove 120, without being discharged toward the outer peripheral surface of the neck 112. Accordingly, the chip discharge ability is remarkably improved as compared with the case where the chips pass between the peripheral surface of the neck 112 and the wall surface of the bore in the work. Thus, the following advantage can be obtained. That is, particularly in the boring bar tool having the large diameter. $d_{11}$ of the neck 112, it is possible to prevent accidents such as the deterioration in the surface roughness of the cut surface due to clogging of the chips or the like beforehand.

Second Modification of First Embodiment

A second modification of the first embodiment is constructed as follows as shown in FIGS. 8 through 11. That is, a cut-out 130 is formed on the outer peripheral surface of the neck 112 which is contiguous to the tip 110. The cut-out 130 extends substantially over the entire axial length of the neck 112, and opens to the clearance recess 116 of the chip pocket 115.

Regarding the amount of cutting-out of the cut-out 130, that is, in a cross-sectional view perpendicular to the axis of the neck 112 as shown in FIG. 11, the amount of retreat $m_{10}$ of the cut-out 130 in the radial direction with respect to an arc $R_{10}$ described along the outer peripheral surface of the neck 112 may suitably be determined in accordance the material or the like of the work. It is necessary, however, that, similarly to the above-described first modification, the amount of retreat $m_{10}$ is set within a range in which the cross-sectional area of the neck 112 does not become less than that of the shank 113.

According to the second modification shown in FIGS. 8 through 11, the chips discharged to the clearance recess 116 are discharged toward the proximal end of the neck 112 through the gap between the cut-out 130 and the wall surface of the bore in the work. Thus, an advantage is obtained in that the chip discharge ability is improved, similarly to the above-described first modification. An advantage is also obtained in that, since the processing of the cut-out 130 can be carried out by means of a single step such as cutting the neck 112 in a single direction, it is possible to easily form the cut-out 130, as compared with the first modification described previously.

Third Modification of First Embodiment

A third modification of the first embodiment is shown in FIGS. 12 through 15, and is constructed as follows. That is, a groove 140 is formed in the outer peripheral surface of the neck 112. The groove 140 has a forward end which opens to the clearance recess 116. The groove 140 extends toward the proximal end of the neck 112 from the forward end thereof in a linear or straight manner.

The groove 140 comprises a first wall 141 and a second wall 142. The first wall 141 is planar and is flush with the clearance recess 116. In a plan view from a direction perpendicular to the first wall 141, the second wall 142 is gradually inclined in a direction spaced away from the axis $O_{10}$ of the shank 113 as it approaches the proximal end of the neck 112 from the forward end thereof. It is necessary to set the configuration and dimension of each of the walls 141 and 142 within such a range that, similarly to the first and second modifications described above, the cross-sectional area of the neck 112 does not become less than that of the shank 113.

According to the third modification shown in FIGS. 12 through 15, the chips are discharged through the groove 140. Thus, an advantage is obtained which is similar to that of the above-mentioned first modification. In addition, the reduction in the cross-sectional area of the neck 112 due to the formation of the groove 140 is made small as the proximal end of the neck 112 is approached from the forward end thereof. As a result, the reduction in mass of the entire neck 112 is made smaller than that in each of the aforementioned first and second modifications. Accordingly, an advantage is obtained in that the loss of the effects of avoiding the shivering or shaking vibration of the neck 112 due to the formation of the groove 140 can be minimized.

Fourth Modification of First Embodiment

A fourth modification of the first embodiment is shown in FIGS. 16 through 19, and is constructed as follows. That is, in the case where the neck 112 has surplus or sufficient mass, the second wall 142 described above may be made a planar surface which extends parallel to the axis $O_{10}$ of the shank 113, and the groove 140 may have a substantially constant width.

Experimental Examples

The advantages of the invention will become apparent on the basis of experimental examples.

(i) Experimental Examples

Figure 20:
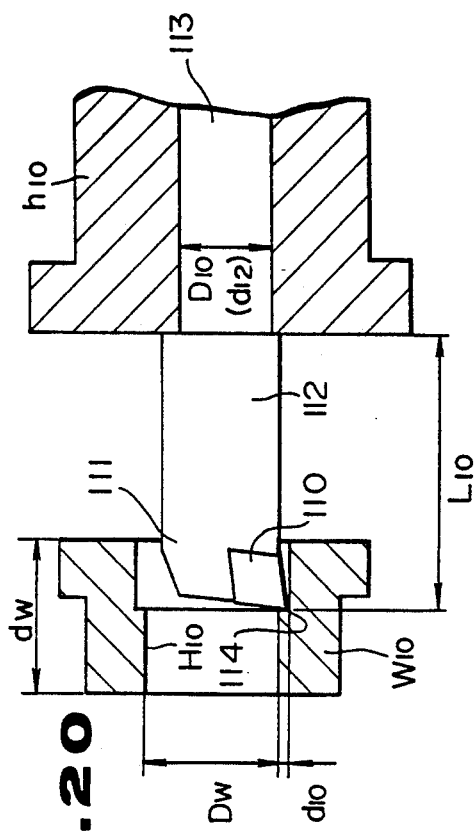
FIG. 20 is a fragmentary view showing the cutting conditions in an experimental example.

A boring bar tool according to the above-mentioned first embodiment was prepared. The boring bar tool was mounted to a lathe through a holder $h_{10}$ as shown in FIG. 20, to process the wall surface of a bore $H_{10}$ in a work $W_{10}$.

The ratio $L_{10}/D_{10}$ between the amount of projection $L_{10}$ from the end face of the holder $h_{10}$ to the cutting edge 114 and the diameter $D_{10}$ of the shank 113 equal to the diameter $d_{12}$ in FIG. 1 varied in the three cases. In each case, the sound pressure level of the shivering or shaking sound, the surface roughness of the finished surface and the degree of true circle were measured, and the finished surface was appraised visually. The results of these measurements and appraisals are indicated in table 1 below.

(ii) Comparative Examples

The conventional boring bar tool shown in FIGS. 49 through 51 was prepared, and was mounted to a lathe to process the wall surface of a bore in a work. At this time, similarly to the experimental examples, the ratio $L_{10}/D_{10}$ between the amount of projection and the diameter of the shank 4 varied in the three cases. In each case, the sound pressure level of the shivering or shaking sound, the surface roughness of the finished surface and the degree of true circle were measured, and the finished surface was appraised visually. The results of these measurements and appraisals are indicated in table 1 below.

In connection with the above, the measurement frequency of the sound pressure level of the shivering or shaking sound was set to 4 kHz in the aforementioned experimental and comparative examples. The reason for this is that when boring processing is carried out under normal cutting conditions, the shivering or shaking sound often occurs in the vicinity of 4 kHz.

Further, the values of the above-described $L_{10}/D_{10}$ in the experimental examples and the comparative examples were set as indicated in table 1 below. Moreover, the dimensions of various sections of the boring bar tool, the material and dimensions of the work, and the cutting conditions are as follows:

| Distance from Shank Axis to Cutting Edge | |
| --- | --- |
| Experimental Example | 8 mm |
| Comparative Example | 8 mm |
| Diameter $d_{10}$ of Neck | |
| Experimental Example | 14.5 mm |
| Comparative Example | 11.5 mm |
| Shank Diameter $d_{12}$ | |
| Experimental Example | 12 mm |
| Comparative Example | 12 mm |
| Bore Diameter $D_W$ | 18 mm |
| Bore Depth $d_W$ in Work | 20 mm |
| Material of Work | SCM 440 (Hardness: $H_RC$ 28) |
| Feed Velocity | 70 m/min. |
| Amount of Feed | 0.1 mm/rev. |
| Amount of Cut $a_{10}$ | 0.5 mm |

As shown in FIG. 21, the boring bar tool according to the second embodiment has a tool body 201 which comprises a nose 211, a neck 212 formed at a proximal end of the nose 211, and a shank 213, generally in the form of a circular cylinder formed at a proximal end of the neck 212. A tip 210 is mounted on one side of the forward end of the nose 211.

The neck 212 is generally in the form of a circular cylinder in which the cross-sectional area of the neck 212 in a plane perpendicular to an axis $O_{20}$ of the shank 213 is gradually reduced, within such a range as not to become less than the cross-sectional area of the shank 213, in the plane the proximal end of the neck 212 is approaded from the forward end thereof. A flank 218 is formed in the outer periphery of the neck 212 contiguous to the tip 210, and approaches the axis $O_{20}$ of the shank 213 as the proximal end of the neck 212 is approached from the forward end thereof.

The diameter $d_{21}$ of the outer peripheral arc of the neck 212 may be suitably determined in accordance with cutting conditions and so on. If possible, however, it is preferable that the diameter $d_{21}$ be set to a value within a range of $1.6S_{20}$ to $1.9S_{20}$ with respect to the distance $S_{20}$ from the axis $O_{20}$ of the shank 213 to the forward end of the cutting edge 214 in the plane extending perpendicular to the axis $O_{20}$, for the reasons discussed previously with reference to the first embodiment illustrated in FIGS. 1 through 3.

The flank 218 is formed by the cutting of the neck 212

TABLE 1-1

| EXPERIMENTAL EXAMPLE | $L_{10}/D_{10}$ | SOUND PRESSURE LEVEL OF SHIVERING OR SHAKING SOUND | FINISHED SURFACE VISUAL | SURFACE ROUGHNESS $R_{max}$ | DEGREE OF TRUE CIRCLE |
| --- | --- | --- | --- | --- | --- |
| 1 | 4 | 71 dB | GOOD | 7.52 um | 5.83 um |
| 2 | 5 | 73 dB | GOOD | 11.28 um | 7.32 um |
| 3 | 6 | 76 dB | SMALL SHIVERING OR SHAKING SURFACE | 12.49 um | 10.22 um |

TABLE 1-2

| COMPARATIVE EXAMPLE | $L_{10}/D_{10}$ | SOUND PRESSURE LEVEL OF SHIVERING OR SHAKING SOUND | FINISHED SURFACE VISUAL | SURFACE ROUGHNESS $R_{max}$ | DEGREE OF TRUE CIRCLE |
| --- | --- | --- | --- | --- | --- |
| 1 | 4 | 87 dB | SMALL SHIVERING OR SHAKING SURFACE | 8.07 um | 7.69 um |
| 2 | 5 | 79 dB | SHIVERING OR SHAKING SURFACE IN THE FORM OF STRIP | 13.12 um | 8.70 um |
| 3 | 6 | 81 dB | SHIVERING OR SHAKING SURFACE IN THE FORM OF UNDULATION OR SWELL | 14.97 um | 16.01 um |

As will be seen from the table 1, according to the boring bar tool of the first embodiment, the following fact has been confirmed. That is, occurrence of the shivering or shaking vibration is effectively restrained, to a greater degree than with the conventional boring bar tool. Accordingly, the shivering or shaking sound during cutting is reduced, and the surface roughness and the degree of true circle of the finished surface are improved.

Second Embodiment

Referring next to FIGS. 21 through 25, there is shown a boring bar tool according to a second embodiment of the invention.

in a direction obliquely intersecting the axis $O_{20}$ of the shank 213. The specific forming procedure of the flank 218 is as follows.

Figure 24B:
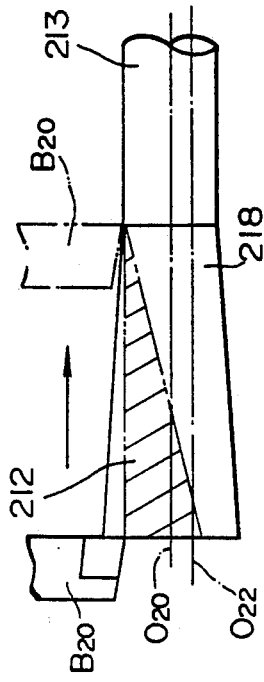

In the forming of the flank 218, as shown in FIG. 24(a), a neck 212a in the form of a circular cylinder is first formed at the forward end of the shank 213. The neck 212a is larger in diameter than the shank 213, and is coaxial with the latter. As shown in FIG. 24(b), a turning tool $B_{20}$ is abutted against the portion of the outer peripheral surface of the neck 212 which is opposite to the rotational axis $O_{21}$, which is parallel to the axis $O_{20}$ of the shank 213, with the shank axis $O_{20}$ positioned therebetween, while rotating the neck 212a about the rotational axis $O_{21}$. The turning tool $B_{20}$ is fed in a direction which intersects the rotational axis $O_{21}$ with an optional angle $\theta_{20}$. By doing so, the outer periphery of the neck 212 is cut gradually toward the axis $O_{20}$ of the shank 213 in accordance with feeding of the turning tool $B_{20}$, as indicated by the shaded area in FIG. 24(b), to form the flank 218. Concurrently, the neck 212 is formed, which is gradually reduced in cross-sectional area.

The inclined angle $\theta_{20}$ defined by the ridgeline 218a of the flank 218 with respect to the axis $O_{20}$ of the shank 213 may be suitably determined in accordance with the entire length, diameter and so on of the neck 212. It is preferable, however, the value of the inclined angle $\theta_{20}$ be at least 1°. If $O_{20}$ is less than 1°, the variation in axial position subsequently to be described may be insufficient, so that the effects of avoiding the shivering or shaking vibration are reduced Further, in the setting of the inclined angle $\theta_{20}$, it is required that the cross-sectional area of the neck 212 at the proximal end thereof, that is, as shown in FIG. 25, in the cross-section of the neck 212 in the plane perpendicular to the axis $O_{20}$ of the shank 213, the area obtained by the subtraction of the cross-sectional area of the portion removed by the above cutting process from the cross-sectional area of the portion encircled by the outer peripheral arc $R_{20}$ described along the outer peripheral surface of the neck 212 be restricted to a range in which it will not become less than the cross-sectional area of the shank 213.

Further, it is preferable that the length of the neck 212 be set to a value within a range of $6S_{20}$ to $10S_{20}$, for the reason discussed previously with reference to the first embodiment.

In the boring bar tool according to the second embodiment of the invention, the flank 218 is formed at the outer periphery of the neck 212, whereby the cross-sectional area of the neck 212 in the plane perpendicular to the axis $O_{20}$ of the shank 213 is reduced as the proximal end of the neck 212 is approached from the forward end thereof. Accordingly, the rigidity of shank 213 becomes less than that of the neck 212. Thus, the boring bar tool according to the second embodiment acquires, as a whole, a flexible or elastic construction in which vibration tends to occur which varies in frequency and phase in accordance with the mass or rigidity, in other words, the spring constant, in each section of the tool body 201.

In the boring bar tool according to the second embodiment of the invention, since the mass of each section of the neck 212 is gradually or non-uniformly reduced in the direction of the shank 213 in accordance with the variation in the cross-sectional area of the neck 212, the vibration occurring at the nose 211 is not uniformly transmitted to the shank 213, but vibrations differing in frequency from each other in accordance with each section of the neck 212 occur in the portion extending from the nose 211 to the proximal end of the neck 212. Further, in the boring bar tool according to the second embodiment of the invention, by the formation of the flank 218, the axis of the neck 212 is gradually spaced away from the axis $O_{20}$ of the shark 213 it approaches the proximal end of the neck 212 from the forward end thereof. Accordingly, the transmitting direction of the vibration gradually varies without the transmitting direction of the vibration being made uniform in the direction of the axis $O_{20}$ of the shank 213. Thus, even if vibration occurs at the nose 211 in accordance with the fluctuation in the cutting resistance, vibrations which are different in frequency and phase from each other occur at each section of the neck 212 and interfere with each other. As a result, the generation of the shivering or shaking vibration is prevented.

In addition, according to the second embodiment illustrated in FIGS. 21 through 25, since the flank 218 is formed at the portion of the outer peripheral surface of the neck 212 which is contiguous to the tip 210, the gap between the portion of the outer peripheral surface of the neck 212 which is contiguous to the tip 210, and the wall surface of the bore in the work is gradually enlarged as the neck 212 is deeply inserted in to the bore in the work, that is, as processing proceeds.

For the reason discussed above, the chips discharged toward the outer periphery of the neck 212 through the clearance recess 216 of the chip pocket 215 are easily discharged out of the bore through the above-mentioned gap. As a result, the chip discharge ability in the case where the processing depth is particularly large or deep is improved, so that accidents such as the damaging of the finished surface and the breakage of the cutting edge 214 due to the clogging of the chips are avoided. Thus, in combination with the aforementioned effects of avoiding the shivering or shaking vibration, it is possible to always obtain excellent finished surfaces.

Figure 26A:
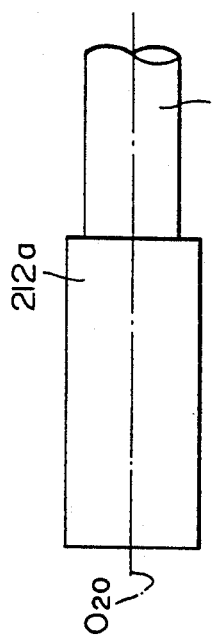
FIGS. 26(a) and 26(b) are fragmentary views showing a modification of the procedure of forming the flank illustrated in FIGS. 24(a) and 24(b)
Figure 26B:
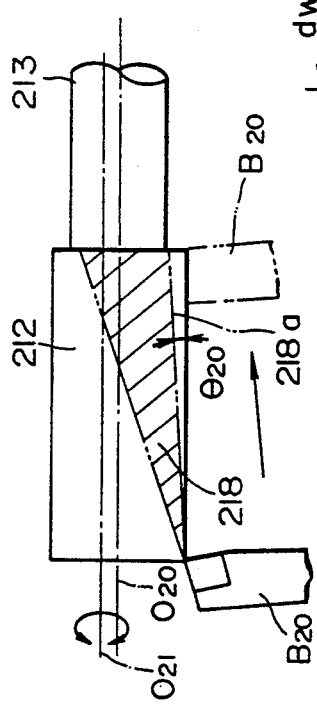

The above-mentioned procedure of forming the flank 218 is a mere example, and the procedure should not be limited to the example. For instance, the procedure of forming the flank 218 may be carried out as shown in FIG. 26(a). That is, a neck 212a in the form of a tapered shaft is formed at the forward end of the shank 213. The neck 212a is gradually enlarged in diameter as it becomes more distant from the shank 213. Subsequently, as shown in FIG. 26(b), the turning tool $B_{20}$ cuts into the portion of the peripheral surface of the neck 212a which is opposite to the rotational axis $O_{22}$, with the axis $O_{20}$ of the shank 213 positioned therebetween. The turning tool $B_{20}$ is fed in parallel relation to the axis $O_{20}$ of the shank 213, whereby the outer periphery of the neck 212a is cut as indicated by the shaded area in FIG. 26(b). In this manner, the flank 218 is formed on the portion of the outer periphery of the neck 212.

Furthermore, the configuration of the chip pocket 215 in the nose 211 should not be limited to the one in the above-described second embodiment. A modification of the second embodiment will be described with reference to FIGS. 27 through 29.

Modification of Second Embodiment

Figure 27:
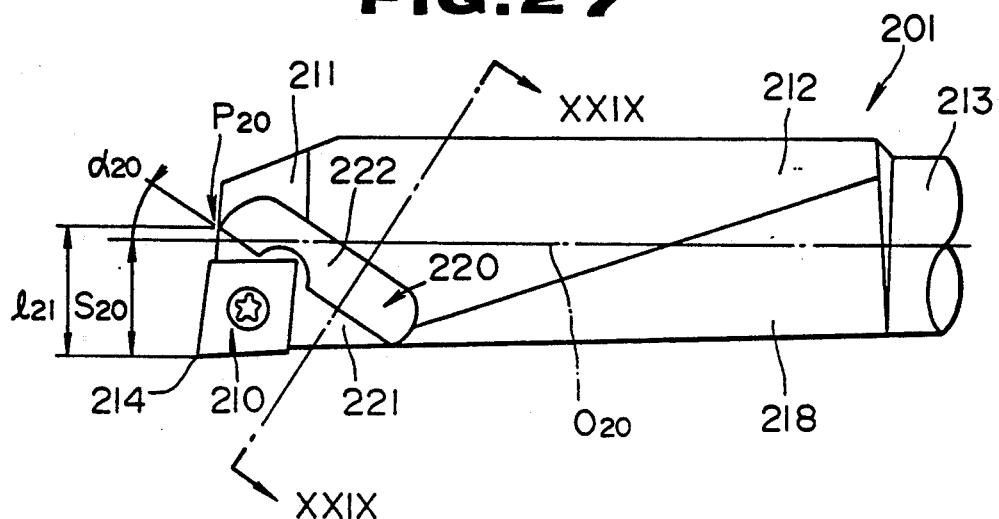
FIG. 27 is a fragmentary top plan view of a boring bar tool according to a modification of the second embodiment illustrated in FIGS. 21 through 23.
Figure 28:
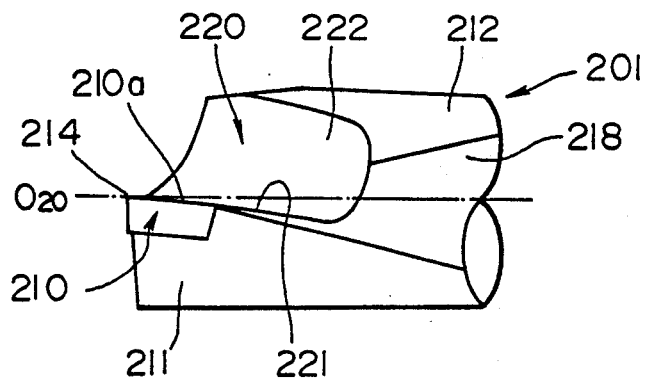
FIG. 28 is a fragmentary side elevational view of the boring bar tool illustrated in FIG. 27.
Figure 29:
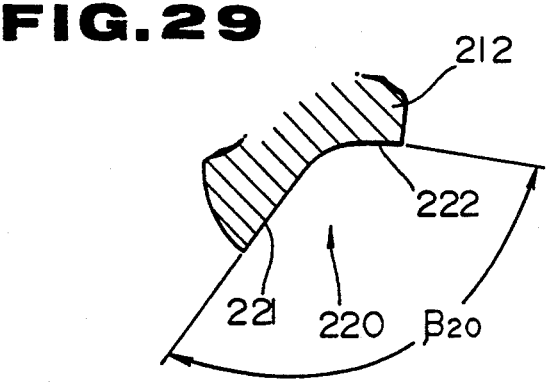
FIG. 29 is a cross-sectional view taken along the line XXIX—XXIX in FIG. 27.

The modification illustrated in FIGS. 27 through 29 is constructed as follows. That is, a portion of the tool body 201 extending from the forward end of the nose 211 to the forward end of the neck 212 is cut out in a direction which intersects the axis $O_{20}$ of the shank 213, toward a portion of the outer peripheral surface of the neck 212 at the forward end thereof, which is contiguous to the tip 210, from the vicinity of the intersected position between the forward end face of the nose 211 and the axis $O_{20}$ of the shank 213 in the plan view of the tool body 201 as shown in FIG. 27, to form a chip pocket 220.

The chip pocket 220 comprises a bottom surface 221 and a wall surface 222. The bottom surface 221 is planar and is substantially flush with the face 210a of the tip 210. The wall surface 222 extends in a direction which intersects the axis $O_{20}$ of the shank 213 when the tool body 201 is viewed in plan.

The distance $l_{21}$ in the tool radial direction between the cutting edge 214 and the point of invention $P_{20}$ between the bottom surface 221 and the ridgeline of the wall surface 222 in the forward end face of the nose 211 is set to a value within such a range as not to exceed $1.3S_{20}$ with respect to the above-described distance $S_{20}$. If the distance $l_{21}$ exceeds $1.3S_{20}$, the wall thickness at the forward end of the nose 211 becomes insufficient, so that the effects of improving rigidity, subsequently to be described, may be lessened.

Further, the inclined angle $\alpha_{20}$ defined by the extending direction of the wall surface 222 with respect to the axis $O_{20}$ of the shank 213 is set to a value within a range of from 15° to 45°. If the inclined angle $\alpha_{20}$ is less than 15° the length of the chip pocket 220 in the shank axis direction is excessively lengthened, so that the rigidity of the neck 212 may be excessively damaged. On the other hand, if the inclined angle $\alpha_{20}$ exceeds 45°, the angle at which the extending direction of the wall surface 222 intersects the generation direction of the chips generated along the face 210a of the tip 210 becomes excessively large, so that the chips may not be smoothly guided toward the outer periphery of the net 212.

Furthermore, the angle $\alpha_{20}$ defined between the bottom surface 221 and the wall surface 222 in a plane perpendicular to the extending set of the wall 222 of the chip pocket 220 is set to a value within a range of from 90° to 120°. If the angle is less than 90°, the volume of the chip pocket 220 becomes insufficient, so that the discharge ability of the chips may deteriorate. On the other hand, if the angle $\alpha_{20}$ exceeds 120°, the wall thickness of the forward end of the nose 211 becomes insufficient, so that the rigidity of the nose 211 may be excessively damaged.

By means of the chip pocket 220, the chips generated at the face 210a of the tip 210 are guided toward the wall surface 222 and are successively discharged toward the flank 218. Thus, the chip discharge ability is further improved as compared with the aforementioned second embodiment, so that the cutting efficiency is improved.

In addition, according to the modification illustrated in FIGS. 27 through 29, a portion of the nose 211 which is opposite to the tip 210 is not cut out, but is left in the form of a rib. Thus, as compared with the second embodiment in which the forward end of the nose 211 is cut out over the entire radial length, the cross-sectional area of the nose 211 increases, so that the rigidity of the nose 211 increases. For this reason, deformation of the nose 211 in accordance with the cutting resistance acting upon the cutting edge 214 is reduced. As a result, an advantage is obtained in that the variation in height of the cutting edge 214 is reduced, so that processing accuracy is improved.

Experimental Example

A comparison was made which was similar to that indicated in the aforesaid table 1, in order to make the advantages of the invention apparent on the basis of experimental examples. As a result of this comparison, the table 2 below was obtained.

TABLE 2-1

| EXPERIMENTAL EXAMPLE | $L_{10}/D_{10}$ | SOUND PRESSURE LEVEL OF SHIVERING OR SHAKING SOUND | FINISHED SURFACE VISUAL | SURFACE ROUGHNESS $R_{max}$ | DEGREE OF TRUE CIRCLE |
|---|---|---|---|---|---|
| 1 | 4 | 67 dB | GOOD | 7.61 um | 5.54 um |
| 2 | 5 | 65 dB | GOOD | 10.50 um | 6.38 um |
| 3 | 6 | 72 dB | SMALL SHIVERING OR SHAKING SURFACE | 11.02 um | 7.33 um |

TABLE 2-2

| COMPARATIVE EXAMPLE | $L_{10}/D_{10}$ | SOUND PRESSURE LEVEL OF SHIVERING OR SHAKING SOUND | FINISHED SURFACE VISUAL | SURFACE ROUGHNESS $R_{max}$ | DEGREE OF TRUE CIRCLE |
|---|---|---|---|---|---|
| 1 | 4 | 87 dB | SMALL SHIVERING OR SHAKING SURFACE | 8.07 um | 7.69 um |
| 2 | 5 | 79 dB | SHIVERING OR SHAKING SURFACE IN THE FORM OF STRIP | 13.12 um | 8.70 um |
| 3 | 6 | 81 dB | SHIVERING OR SHAKING SURFACE IN THE FORM OF UNDULATION OR SWELL | 14.97 um | 16.01 um |

Third Embodiment

Figure 30:
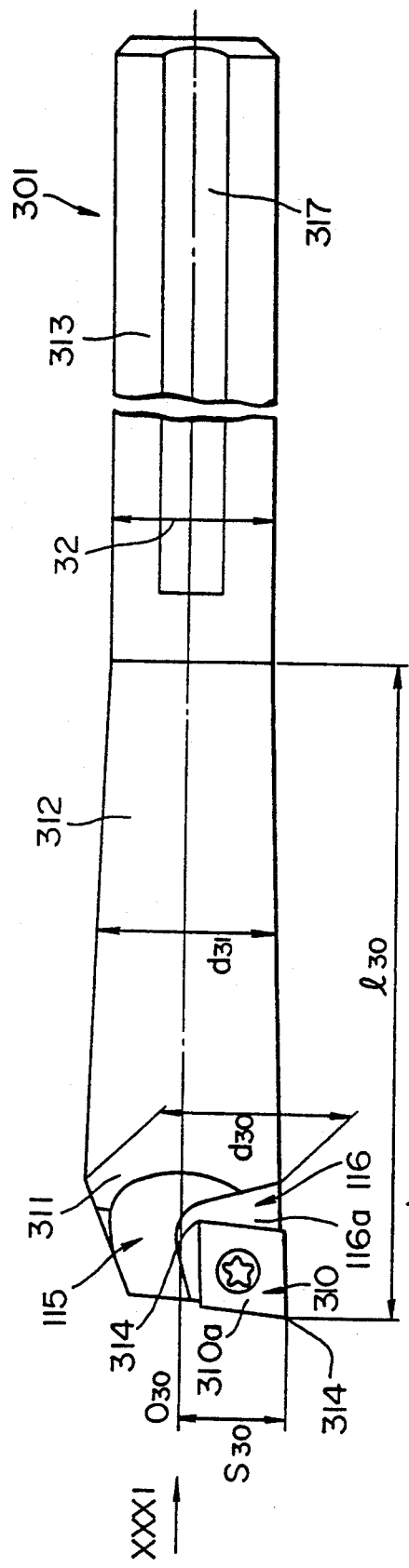
FIG. 30 is a top plan view of a boring bar tool according to a third embodiment of the invention.
Figure 32:
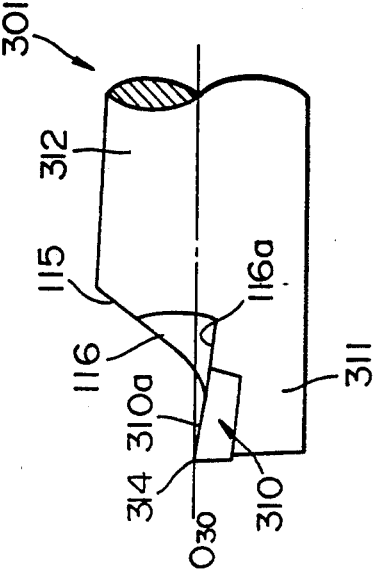
FIG. 32 is a fragmentary view as viewed from the arrow XXXII in FIG. 30.
Figure 31:
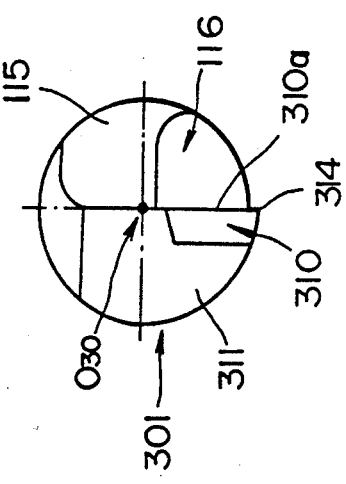
FIG. 31 is a view as viewed from the arrow XXXI in FIG. 30.

Referring next to FIGS. 30 through 32, there is shown a boring bar tool according to a third embodiment of the invention.

As shown in FIG. 30, the boring bar tool according to the third embodiment has a tool body 301 which comprises a nose 311, a neck 312 formed at a proximal end of the nose 311, and a shank 313, generally in the form of a circular cylinder formed at a proximal end of the neck 312. A tip 310 is mounted on one side of the forward end of the nose 311.

The neck 312 is generally in the form of a tapered shaft in which the diameter of the neck 312 is gradually reduced from the forward end of the neck 312, which is contiguous to the nose 311, toward the proximal end of the neck 312, which is contiguous to the shank 313. The neck 312 has a cross-sectional area in a plane perpendicular to an axis $O_{30}$ which is coaxial with the outer peripheral arc of the shank 313 in the plane.

The neck 312 has various sections whose respective diameters $d_{31}$ are determined in such a manner that the diameter $d_{31}$ at the forward end of the neck 312 is identical with the diameter $d_{30}$ of the proximal end of the nose 311, and the diameter $d_{31}$ of the proximal end of the neck 312 is identical with the diameter $d_{32}$ of the shank 313. The diameters $d_{31}$ of the respective sections from the forward end of the neck 312 to the proximal end thereof are uniformly reduced at an uniform or constantly tapering rate.

The diameter $d_{30}$ of the forward end of the neck 312 and the diameter $d_{32}$ of the proximal end of the neck 312 are suitably determined in accordance with cutting conditions or the like. It is preferable, however, that the diameter $d_{30}$ of the forward end of the neck 312 be within a range of from $1.6S_{30}$ to $1.9S_{30}$ with respect to the distance $S_{30}$ from the axis $O_{30}$ of the shank 313 to the cutting edge 314 of the tip 310 in the plane perpendicular to the axis $O_{30}$ of the shank 313, for the reasons discussed previously with reference to the first embodiment illustrated in FIGS. 1 through 3.

Further, it is preferable that the length $l_{30}$ of the neck 312 be set to a value within a range of $6S_{30}$ to $10S_{30}$, for the reasons discussed previously with reference to the first embodiment.

In the boring bar tool according to the third embodiment of the invention, the cross-sectional area of the neck 312 in the plane perpendicular to the axis $O_{30}$ of the shank 313 is uniformly and gradually reduced toward the proximal end of the neck 312 from the forward end thereof. Accordingly, the rigidity of the shank 313 becomes less than that of the neck 312. Thus, the boring bar tool according to the third embodiment acquires, as a whole, a flexible or elastic construction in which vibration tends to occur which varies in frequency and phase in accordance with the mass or rigidity, in other words, the spring constant, in each section of the boring bar tool.

Further, according to the third embodiment illustrated in FIGS. 30 through 32, since the diameter $d_{31}$ of the neck 312 is gradually reduced toward the proximal end of the neck 312 from the forward end thereof, it is possible to always obtain excellent finished surfaces, for the reasons discussed previously with reference to the second embodiment illustrated in FIGS. 21 through 23.

Furthermore, the configuration of the chip pocket 315 in the nose 311 should not be limited to the one in the above-described second embodiment.

Modification of Third Embodiment

Figure 33:
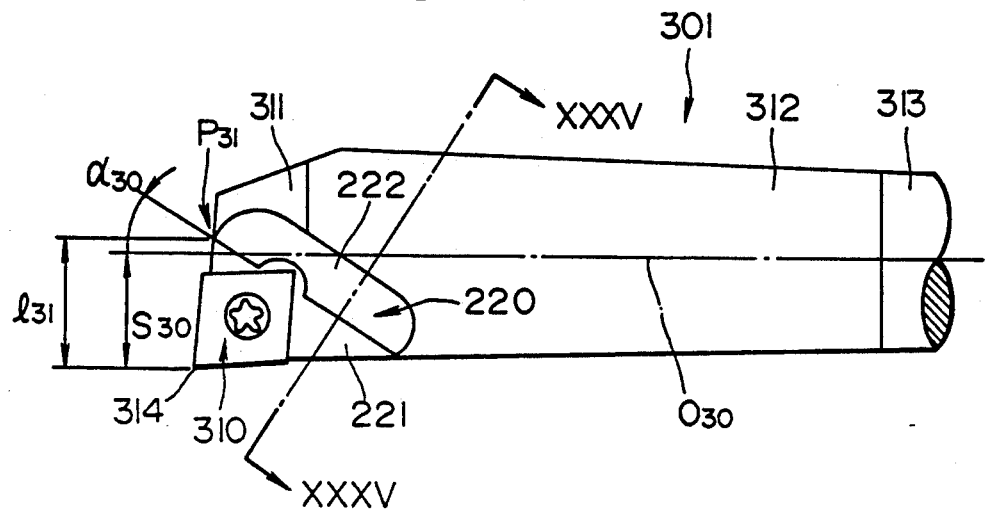
FIG. 33 is a fragmentary top plan view of a boring bar tool according to a modification of the third embodiment illustrated in FIGS. 30 through 32.
Figure 34:
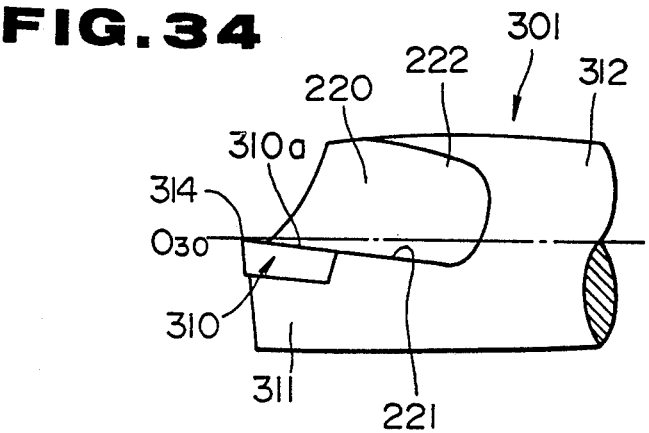
FIG. 34 is a fragmentary side elevational view of the boring bar tool illustrated in FIG. 33.
Figure 35:
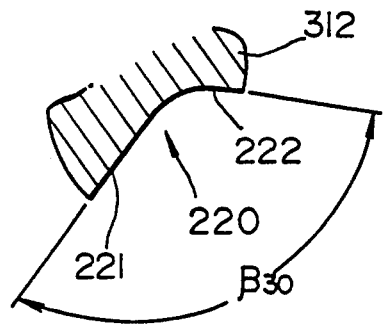
FIG. 35 is a cross-sectional view taken along the line XXXV—XXXV in FIG. 33.

As illustrated in FIGS. 33 through 35, in a modification of the third embodiment, the portion of the tool body 301 extending from the forward end of the nose 311 to the forward end of the neck 312 is cut out in a direction which intersects the axis $O_{30}$ of the shank 313, toward a portion of the outer peripheral surface of the neck 312 at the forward end thereof, which is contiguous to the tip 310, from the vicinity of the intersected position between the forward end face of the nose 311 and the axis $O_{30}$ of the forward end face of the nose 311 and the axis $O_{30}$ of the shank 313 in the plan view of the tool body 301 as shown in FIG. 33, to form a chip pocket 320, for the reasons discussed previously with reference to the modification of the second embodiment illustrated in FIGS. 27 through 29.

Experimental Examples

A comparison was made which was similar to that indicated in the aforementioned table 1, in order to make the advantages of the invention apparent on the basis of experimental examples. By the comparison, the table 3 below was obtained.

TABLE 3-1

| EXPERIMENTAL EXAMPLE | $L_{10}/D_{10}$ | SOUND PRESSURE LEVEL OF SHIVERING OR SHAKING SOUND | FINISHED SURFACE | | DEGREE OF TRUE CIRCLE |
|---|---|---|---|---|---|
| | | | VISUAL | SURFACE ROUGHNESS $R_{max}$ | |
| 1 | 4 | 69 dB | GOOD | 7.95 um | 5.89 um |
| 2 | 5 | 70 dB | GOOD | 10.72 um | 6.92 um |
| 3 | 6 | 74 dB | SMALL SHIVERING OR SHAKING SURFACE | 11.53 um | 8.05 um |

TABLE 3-2

| COMPARATIVE EXAMPLE | $L_{10}/D_{10}$ | SOUND PRESSURE LEVEL OF SHIVERING OR SHAKING SOUND | FINISHED SURFACE | | DEGREE OF TRUE CIRCLE |
|---|---|---|---|---|---|
| | | | VISUAL | SURFACE ROUGHNESS $R_{max}$ | |
| 1 | 4 | 87 dB | SMALL SHIVERING OR SHAKING SURFACE | 8.07 um | 7.69 um |
| 2 | 5 | 79 dB | SHIVERING OR SHAKING SURFACE IN THE FORM OF STRIP | 13.12 um | 8.70 um |
| 3 | 6 | 81 dB | SHIVERING OR SHAKING SURFACE IN THE FORM OF UNDULATION OR SWELL | 14.97 um | 16.01 um |

Fourth Embodiment

Referring next to FIGS. 36 through 39, there is shown a boring bar tool according to a fourth embodiment of the invention.

As shown in FIG. 36, the boring bar tool according to the third embodiment has a tool body 401 generally in the form of a circular cylinder, which comprises a nose 411, a neck 412 formed at a proximal end of the nose 411, and a shank 413 formed at a proximal end of the neck 412. A tip 410 is mounted on one side of a forward end of the nose 411.

As shown in FIGS. 36 through 38, the tip 410 is detachably mounted on the nose 411 such that either one of a pair of cutting edges 414 projects from a flank 451 at the forward end of the nose 411 and from the outer peripheral surface thereof.

A chip pocket 420 is formed at the portion of the outer peripheral surface of the tool body 401 which extends from the nose 411 to the neck 412. The chip pocket 420 opens upwardly toward the forward end of the tool body 401.

The chip pocket 420 comprises a bottom surface 421 and a longitudinal wall surface 422. The bottom surface 421 is planar and extends straight to the radial direction of the nose 411 so that the bottom surface 421 is substantially flush with the face 410a of the tip 410. The longitudinal wall surface 422 projects from the bottom surface 421, and extends straight in a direction which intersects the axis $O_{40}$ of the shank 413 from a portion of the flank 451 more adjacent to the tip 410 than the end of the flank 451 on the radially opposite side thereof, so that the longitudinal wall surface 422 reaches a portion of the outer peripheral surface of the neck 412, which is contiguous to the tip 410.

As shown in FIG. 37, the longitudinal end surface 422 is composed of an arcuate section 423 contiguous to the bottom surface 421 and a planar section 424, which is contiguous to the arcuate section 423 and which extends straight up to the outer peripheral surface of the tool body 401.

As shown in FIG. 36, an inclined angle $\alpha_{40}$ defined by the extending direction of the longitudinal wall surface 422, that is, by a line of intersection 425 described along points at which the arcuate section 423 and the bottom surface 421 intersect, with respect to the axis $O_{40}$ of the shank 413, is suitably determined in accordance with the material of the work. Preferably, however, the inclined angle $\alpha_{40}$ is set to a value within a range of from 15° to 45°, for the reasons discussed previously with reference to the modification of the second embodiment illustrated in FIGS. 27 through 29.

The distance $l_{41}$ in the tool radial direction from a point of intersection $P_{41}$ at which the bottom surface 421 and the ridgeline of the flank 451 intersect in the forward end of the longitudinal wall surface 422 to the cutting edge 414 is set to a value within such a range as not to exceed $1.3S_{40}$ with respect to the distance $S_{40}$ in the tool radial direction from the axis $O_{40}$ of the shank 413 to the cutting edge 414, for the reasons discussed previously with reference to the modification of the second embodiment illustrated in FIGS. 27 through 29.

Furthermore, the angle defined by the longitudinal wall surface 422 with respect to the bottom surface 421, that is, as shown in FIG. 39, the angle $\beta_{40}$ defined by the bottom surface 421 and the planar section 424 of the longitudinal wall surface 422 in a plane perpendicular to the extending direction of the longitudinal wall surface 422 of the chip pocket 420 may be suitably determined in accordance with cutting conditions or the like. Preferably, the angle $\beta_{40}$ is set to a value within a range of from 90° to 120°, for the reasons discussed previously with reference to the modification of the second embodiment illustrated in FIGS. 27 through 29.

As shown in FIGS. 36 through 38, the neck 411 is formed with a flank 418 which is formed in the outer peripheral surface of a circular cylinder formed larger than the shank 413. The flank 418 approaches the axis $O_{40}$ of the shank 413 as it approaches the proximal end of the neck 412 from a position on the forward end thereof which is contiguous to the opening of the chip pocket 420.

The flank 418 is formed such that the outer periphery of the neck 412 is cut out generally in the form of a crescent in the plane perpendicular to the axis $O_{40}$ of the shank 413. The configuration of the cut-out is so determined as to be non-uniformly reduced toward the proximal end of the neck 412 from the forward end thereof within such a range that it in not reduced in area to a point at which its area is less than the cross-sectional area of the shank 413.

Further, the neck 412 has a length which is determined in a manner similar to that described previously with reference to the first embodiment illustrated in FIGS. 1 through 3.

Since cutting resistance in a direction substantially perpendicular to the face 410a of the tip 410 is applied to the nose 411, the cutting resistance easily deforms the nose 411 in the case where, as in the case of the conventional boring bar tool described with reference to FIGS. 46 through 48, the rigidity of the nose 411 is low as the nose 411 is cut out over its entire radial length. As a result of this deformation, the height of the cutting edge 414 is easily changed, so that the processing accuracy deteriorates.

In the boring bar tool according to the fourth embodiment illustrated in FIGS. 36 through 38, however, the longitudinal wall surface 422 of the tip pocket 420 extends in a direction which intersects axis $O_{40}$ of the shank 413 from the portion of the flank 451 which is located on the opposite side of the tip 410 and radially more inward position of the tool body 401 than that of the butting edge 414. Accordingly, the portion of the nose 411 behind the tip pocket 420, that is, the portion of the forward end of the nose 411 located on the radially opposite side with respect to the tip 410, is left in the form of a rib. For this reason, the rigidity of the nose 411 is improved, and the amount of deformation of the nose 411 due to the cutting resistance is reduced. As a result, the variation in the height of the cutting edge 414 is reduced, so that excellent processing accuracy can be realized.

In this case, the chips generated by the cutting edge 414 are moved along the bottom surface 421 of the chip pocket 420, and are successively guided to the flank 418 at the outer periphery of the net 412 along the planar section 424, while being rounded off along the bottom surface 421 of the chip pocket 420. For this reason, the chip discharge ability does not deteriorate at all, even if the chip pocket 420 is not cut out over the entire radial length of the nose 411.

In addition, since the flank 418 gradually approaches the axis $O_{40}$ of the shank 413 as it approaches the proximal end of the neck 412 from the forward end thereof, the gap between the nose 411 and the neck 412 and the wall surface of the bore in the work is gradually enlarged as the nose 411 and the neck 412 are inserted in the bore in the work, that is, as processing proceeds. Thus, an advantage is obtained in that even if the processing depth is particularly large or deep, the chip discharge ability can be maintained at a high level.

Further, in the boring bar tool according to the fourth embodiment, since the mass of each section of the neck 412 is non-uniformly reduced in the direction of the shank 413 in accordance with the variation in the cross-sectional area of the neck 412 and, further, since the flank 418 is formed, the axis position of the neck 412 is gradually shifted or deviated from the axis $O_{40}$ of the shank 413. Accordingly, even if vibration occurs at the nose 411 in accordance with the fluctuation in the cutting resistance, the vibration is not uniformly transmitted to the shank 413. Thus, vibrations, which are different in frequency and phase from each other, occur at each section of the neck 412 and interfere with each other. As a result, the generation of the shivering or shaking vibration is prevented.

The longitudinal wall surface 422 of the chip pocket 420 is not necessarily required to extend straight in the direction perpendicular to the axis $O_{40}$ of the shank 413. Various modifications may be made to the fourth embodiment.

Modification of Fourth Embodiment

As shown in FIG. 40, a curved section 452 may be provided which is curved in an arcuate manner at the outer periphery of the tool body 401. In this case, it is preferable that the distance $l_{41}$ to the cutting edge 414 from the point of intersection $P_{41}$ between the bottom surface 421 and the ridgeline on the flank 451 at the forward end of the longitudinal wall surface 422 is set within a range similar to that of the the aforesaid fourth embodiment. It is also preferable, however, that the distance $l_{42}$ from the forward end of the cutting edge 414 to a point $P_{42}$ at which the bottom surface 421 and the ridgeline on the longitudinal wall surface 422 on the side of the peripheral surface of the neck 412 intersect is set within a range of from $l_{41}$ to $3l_{41}$ with respect to the above distance $l_{41}$. If the distance $l_{42}$ is less than $l_{41}$, the discharge direction of the chips discharged toward the outer peripheral surface of the neck 412 from the chip pocket 420 becomes excessively inclined with respect to the axis $O_{40}$ of the shank 413, so that the chips may not be smoothly guided toward the proximal end of the neck 412. On the other hand, if the distance $l_{42}$ exceeds $3l_{41}$, the length of the cut-out in the axial direction of the neck 412 becomes excessively large, so that the rigidity may be excessively reduced.

Fifth Embodiment

A fifth embodiment of the invention will be described with reference to FIGS. 41 through 45.

The boring bar tool according to the fifth embodiment of the invention comprises a turning tool body 501. The tool body 501 is composed of a nose 511, a neck 512 formed at a proximal end of the nose 511, and a shank 513 formed at a proximal end of the neck 512, similarly to the previous embodiments.

A tip 510 is mounted to the forward end of the tool body 501. A chip pocket 520, which is contiguous to a face 510a of the tip 510, is formed in the forward end of the tool body 501. The chip pocket 520 is composed of a first chip-pocket section 522 and a second chip-pocket section 523. The first chip-pocket section 522 is inclined at an angle $\theta_{50}$ that is within a range of from 15° to 45° with respect to the axis $C_{50}$ of the tool body 501, and opens to the outer peripheral surface of the tool body 501. The second chip-pocket section 523 extends along the front cutting edge 514 of the tip 510 and opens to a portion of the outer peripheral surface of the tool body 501 which is opposite to the side where the first chip-pocket section 522 opens. The intersected ridgeline $E_{50}$ between the bottom surface 522a of the first chip-pocket section 522 and the outer peripheral surface of the tool body 501 extends in a manner in which it is in substantially parallel relation to the axis $C_{50}$ of the tool body 501.

The tip 510 is formed with a generally rectangular configuration. The tip 510 is seated on a mounting recess 551 which is formed at the forward end of the tool body 501 under conditions such that the mounting recess 551 opens forwardly and laterally of the tool body 501. The tip 510 is fixedly mounted to the tool body 501 by a fixing bolt 552 which extends through the tip 510.

As shown in FIG. 41, under conditions in which the tip 510 is mounted to the recess 551, the tip 510 is positioned such that a pair of sides of the tip 510 are abutted respectively against a pair of inner walls of the mounting recess 551 which intersect with each other. As shown in FIG. 43, the upper rake angle $\alpha_{50}$ is given to the tip 510. Further, in a side elevational view, the nose 510c of the tip 510 is in agreement with the axis $C_{50}$ of the tool body 501.

Figure 44:
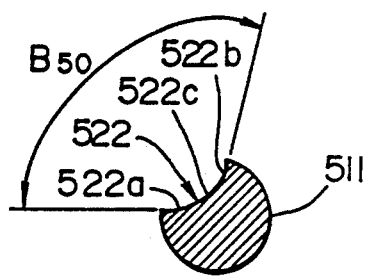
FIG. 44 is a cross-sectional view taken along the line XXXXIV—XXXXIV in FIG. 41.
Figure 52:
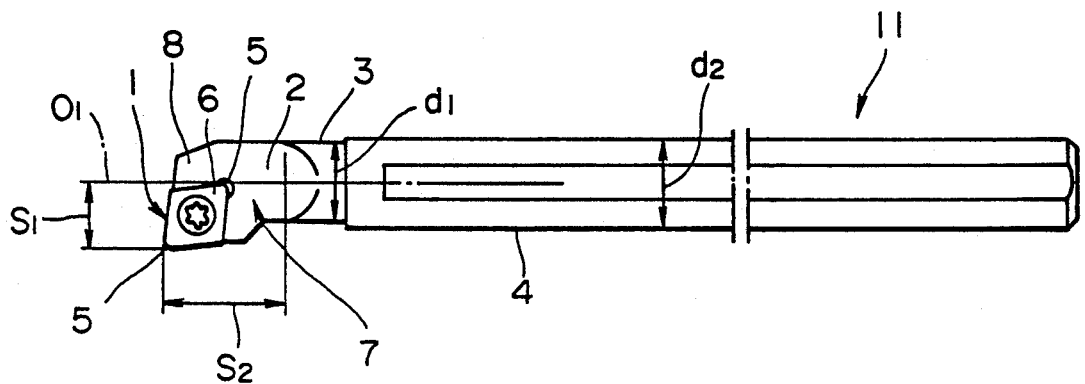
FIG. 52 is a top plan view of still another conventional boring bar tool.
Figure 53:
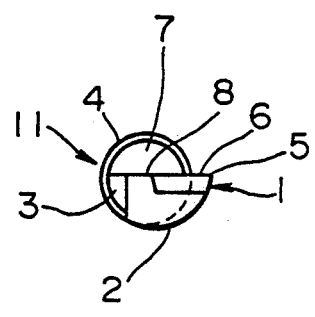
FIG. 53 is a front elevational view of the boring bar tool illustrated in FIG. 52.
Figure 54:
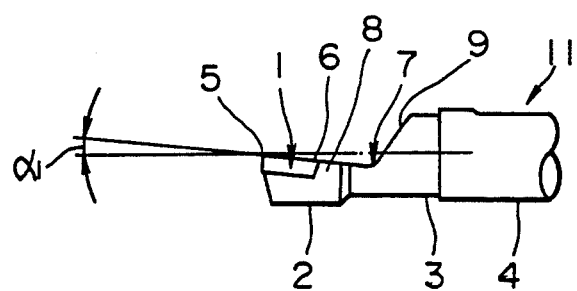
FIG. 54 is a fragmentary side elevational view of the boring bar tool illustrated in FIG. 52.

As shown in FIG. 44, the first chip-pocket section 522 is composed of the bottom surface 522a, a side surface 522b and a curved surface 522c, and opens upwardly toward the forward end of the tool body 501. The bottom surface 522a is parallel with the axis $C_{50}$ of the tool body 501. The side surface 522b is formed at an opening angle $\beta_{50}$ to the bottom surface 522a. The curved surface 522c smoothly connects the bottom surface 522a and the side surface 522b to each other.

It is preferable that an opening angle $\beta_{50}$ is used which is within a range of from 90° to 120°. If the opening angle $\beta_{50}$ less than 90°, the volume of the chip pocket 520 may become insufficient, so that the chip discharge ability is reduced. Further, if the opening angle $\beta_{50}$ exceeds 120°, the wall thickness of the forward end of the tool body 501 becomes insufficient, so that sufficient rigidity cannot be obtained.

As shown in FIG. 43, in a side elevational view, the bottom surface 522a of the first chip-pocket section 522, which is parallel to the axis $C_{50}$ of the tool body 501, is positioned below the axis $C_{50}$ at a distance $L_{55}$.

The first chip-pocket section 522 is such that the angle $\alpha_{50}$ defined between the axis $C_{50}$ and a line of intersection $M_{50}$ described along points at which the bottom surface 522a intersects the curved surface 522c is set within a range of from 15° to 45° as described previously and for the reasons discussed previously with reference to the above-described embodiments.

A distance $L_{54}$ in the radial direction of the tool body 501, from a point at which the bottom surface 522a intersects the ridgeline on the flank at the forward end of the side surface 522b to the nose 510c of the tip 510 is set so as to be equal to or smaller than $1.3S_{50}$, if the distance in the radial direction of the tool body 501 is defined as being $S_{50}$ from the axis $C_{50}$ to the nose 510c, for the reasons discussed previously with reference to the aforementioned embodiments.

Further, a distance $L_{53}$ from the nose 510c of the tip 510 to a point $G_{52}$ at which the bottom surface 522a intersects the ridgeline of the side surface 522b adjacent to the outer peripheral surface of the tool body 501, is set within a range of $L_{54} \leq L_{53} \leq 3L_{54}$, for the reasons discussed previously with reference to the aforesaid embodiments.

The second chip-pocket section 523 is also such that its cross-section is formed into a configuration substantially similar to the first chip-pocket section 522.

Thus, by means of the pair of first and second chip-pocket sections 522 and 523, as shown in FIGS. 41 through 43, a thick wall section 554 is formed at the forward end of the tool body 501, and extends to a location adjacent to the side of the tip 510.

In the fifth embodiment illustrated in FIGS. 41 through 43, a sub-chip pocket 555 substantially flush with the face 510a of the tip 510 is formed, over a minute width, at the junction between the tip 510 and each of the first and second chip-pocket sections 522 and 523. The sub-chip pocket 555 smoothly connects the face 510a and each of the first and second chip-pocket sections 522 and 523 to each other.

In the boring bar tool constructed as above, according to the fifth embodiment, the thick wall section 554 is formed by the first chip-pocket section 522 and the second chip-pocket section 523 at a location adjacent to the side of the tip 510. By doing so, the reduction in the rigidity of the mounting section of the tip 510 is restrained.

Even if the upper rake angle $\alpha_{50}$ of the tip 510 is made large, the bottom surface 522a is shifted or deviated in parallel relation to the axis $C_{50}$ in accordance with the enlargement of the rake angle $\alpha_{50}$, because the bottom surface 522a is parallel to the axis $C_{50}$ of the tool body 501. Thus the reduction in the wall thickness of the forward end of the tool body 501 is restrained.

Figure 45:
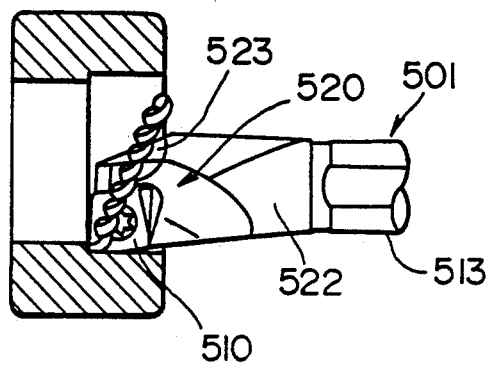
FIG. 45 is a schematic cross-sectional view showing the discharge conditions of chips in the fifth embodiment illustrated in FIGS. 41 through 43.

The chips generated during cutting are smoothly discharged to the outside through the first chip-pocket section 522 or the second chip-pocket section 523, in accordance with the cutting direction or the cutting conditions, as shown in FIG. 45.

Accordingly, shivering or shaking during cutting is restrained, and a boring bar tool which is high in processing accuracy is obtained.

In connection with the above, various configurations, dimensions and so on of the various sections illustrated in the above fifth embodiment are merely examples, and may thus be varied or modified on the basis of design requirements or the like.

What is claimed is:

1. A boring bar tool for use with a tip, said boring bar tool having a tool body which comprises:

a nose, said tip being mounted to one side of a forward end of said nose;

a neck formed at a proximal end of said nose; and a shank in the form of a shaft formed at a proximal end of said neck, wherein said neck is formed into a shaft-like configuration in which the cross-sectional area of said neck in a plane perpendicular to said axis of said shank is gradually reduced within such a range as not to become less than the cross-sectional area of said shank in said plane as the proximal end of said neck is approached from a forward end thereof, and in which a flank is formed on an outer periphery of said neck contiguous to said tip, said flank approaching said axis of said shank as it approaches the proximal end of said neck from the forward end thereof.

* * * * *